United States Patent
Azvine et al.

(10) Patent No.: US 10,191,769 B2
(45) Date of Patent: Jan. 29, 2019

(54) EFFICIENT EVENT FILTER

(71) Applicant: BRITISH TELECOMMUNICATIONS PLC, London (GB)

(72) Inventors: Behnam Azvine, London (GB); Trevor Philip Martin, London (GB)

(73) Assignee: British Telecommunications Public Limited Company, London (GB)

(*) Notice: Subject to any disclaimer, the term of this patent is extended or adjusted under 35 U.S.C. 154(b) by 365 days.

(21) Appl. No.: 15/024,555

(22) PCT Filed: Sep. 24, 2014

(86) PCT No.: PCT/GB2014/000379
§ 371 (c)(1),
(2) Date: Mar. 24, 2016

(87) PCT Pub. No.: WO2015/044630
PCT Pub. Date: Apr. 2, 2015

(65) Prior Publication Data
US 2016/0232032 A1    Aug. 11, 2016

(30) Foreign Application Priority Data
Sep. 26, 2013    (EP) .................................. 13250101

(51) Int. Cl.
*G06F 9/44* (2018.01)
*G06F 9/48* (2006.01)
(Continued)

(52) U.S. Cl.
CPC ............ *G06F 9/4881* (2013.01); *G06F 9/542* (2013.01); *G06F 11/3072* (2013.01);
(Continued)

(58) Field of Classification Search
None
See application file for complete search history.

(56) References Cited

U.S. PATENT DOCUMENTS 8,494,985 B1 * 7/2013 Keralapura ......... H04L 63/0245
706/12
2007/0209074 A1 9/2007 Coffman
(Continued)

OTHER PUBLICATIONS

International Search Report for PCT/GB2014/000379, dated Dec. 12, 2014, 3 pages.
(Continued)

*Primary Examiner* — Qamrun Nahar
(74) *Attorney, Agent, or Firm* — Amy M. Salmela; Patterson Thuente Pedersen, P.A.

(57) ABSTRACT

A sequence identification apparatus comprising a processor, wherein the apparatus is adapted to access a directed acyclic graph data structure of equivalence classes of events in event sequences identified in a plurality of time-ordered events, and wherein the graph is optimized such that initial and final sub-sequences of event sequences having common equivalence classes are combined in the graph, the apparatus comprising: a code generator adapted to generate executable code corresponding to the graph such that the code includes an instruction sequence for each event classification of the graph, the code sequence for an event classification being adapted to evaluate criteria to determine if an event corresponds to the event classification; a virtual machine adapted to execute the generated executable code such that, in use, the executable code filters incoming time-ordered events based on the graph.

9 Claims, 16 Drawing Sheets

(51) Int. Cl.
*G06F 9/54* (2006.01)
*G06F 11/30* (2006.01)
*G06F 21/55* (2013.01)
*G06F 8/30* (2018.01)

(52) U.S. Cl.
CPC .............. *G06F 21/552* (2013.01); *G06F 8/30* (2013.01); *G06F 2201/86* (2013.01)

(56) References Cited

U.S. PATENT DOCUMENTS

| | | |
|---|---|---|
| 2008/0109454 A1 | 5/2008 | Willse et al. |
| 2010/0011410 A1 | 1/2010 | Liu |
| 2011/0145185 A1 | 6/2011 | Wang et al. |
| 2013/0006915 A1 | 1/2013 | Gunawardana et al. |
| 2014/0095425 A1 | 4/2014 | Sipple |
| 2014/0279757 A1 | 9/2014 | Shimanovsky et al. |
| 2014/0373031 A1 | 12/2014 | Ide et al. |
| 2016/0239660 A1 | 8/2016 | Azvine et al. |
| 2018/0075038 A1 | 3/2018 | Azvine et al. |

OTHER PUBLICATIONS

Written Opinion of the International Searching Authority for PCT/GB2014/000379, dated Dec. 12, 2014, 7 pages.

EP Search Report for EP 13250101.6, dated Feb. 25, 2014, 7 pages.

Marceau C ED—Association for Computing Machinery; "Characterizing the Behavior of a Program Using Multiple-Length N-Grams", Proceedings of the New Security Paradigms Workshop. (NSPW), Ballycotton, County Cork, Ireland, Sep. 18-22, 2000; [New Security Paradigms Workshop], New York, NY ; ACM, US, Sep. 18, 2000 (Sep. 18, 2000), pp. 101-110, XP000988605, DOI : 10.1145/366173. 366197 ISBN: 978-1-58113-260-1.

Alberto Apostolico, Mikhail J. Attalah: "Searching for Ephemeral Subseqences in Strings", Internet Article, Dec. 1996 (Dec. 1996), XP002719919, Retrieved from the Internet: URL:http://docs.lib.purdue.edu/cgi/viewcontent.cgi?article=2329&context=cstech [retrieved on Feb. 7, 2014].

A.L. Barabasi, "The origin of bursts and heavy tails in human dynamics", Nature, pp. 207-211, 2005.

U.S. Appl. No. 15/562,095, filed Sep. 27, 2017, Inventors: Azvine et al.

Ganter, Bernard; "Formal Concept Analysis: Methods and Applications in Computer Science"; Summer 2002; 93 pages.

Martin, T. P.; "The X-mu Representation of Fuzzy Sets—Regaining the Excluded Middle"; Intelligent Systems Laboratory University of Bristol, Bristol, BS8 1TR UK; 978-1-4799-1568-2/13; 2013 IEEE; 7 pages.

Kruse, et al.; Texts in Computer Science; "Computational Intelligence a Methodological Introduction"; DOI 10.1007/978-1-4471-5013-8, Springer-Verlag London 2013; 482 pages.

Manning et al.; "Introduction to Information Retrieval"; Cambridge University Press; P1: KRU/IRP irbook CUUS232/Manning 978 0 521 86571 5; May 27, 2008; 504 pages.

Ganter et al.; "Finger Exercises in Formal Concept Analysis" Institut fur Algebra TU Dresden, D-01062 Dresden ICCL Summer School, Jun./Jul. 2006; 113 pages.

International Search Report, PCT Application No. PCT/GB2014/00378, dated Oct. 22, 2014, 2 pages.

Notice from the European Patent Office, dated Oct. 1, 2007, Concerning Business Methods vol. 30, No. 11, Nov. 2007, pp. 592-593.

Application and File History for U.S. Appl. No. 15/024,572, filed Mar. 24, 2016. Inventors: Azvine et al.

\* cited by examiner

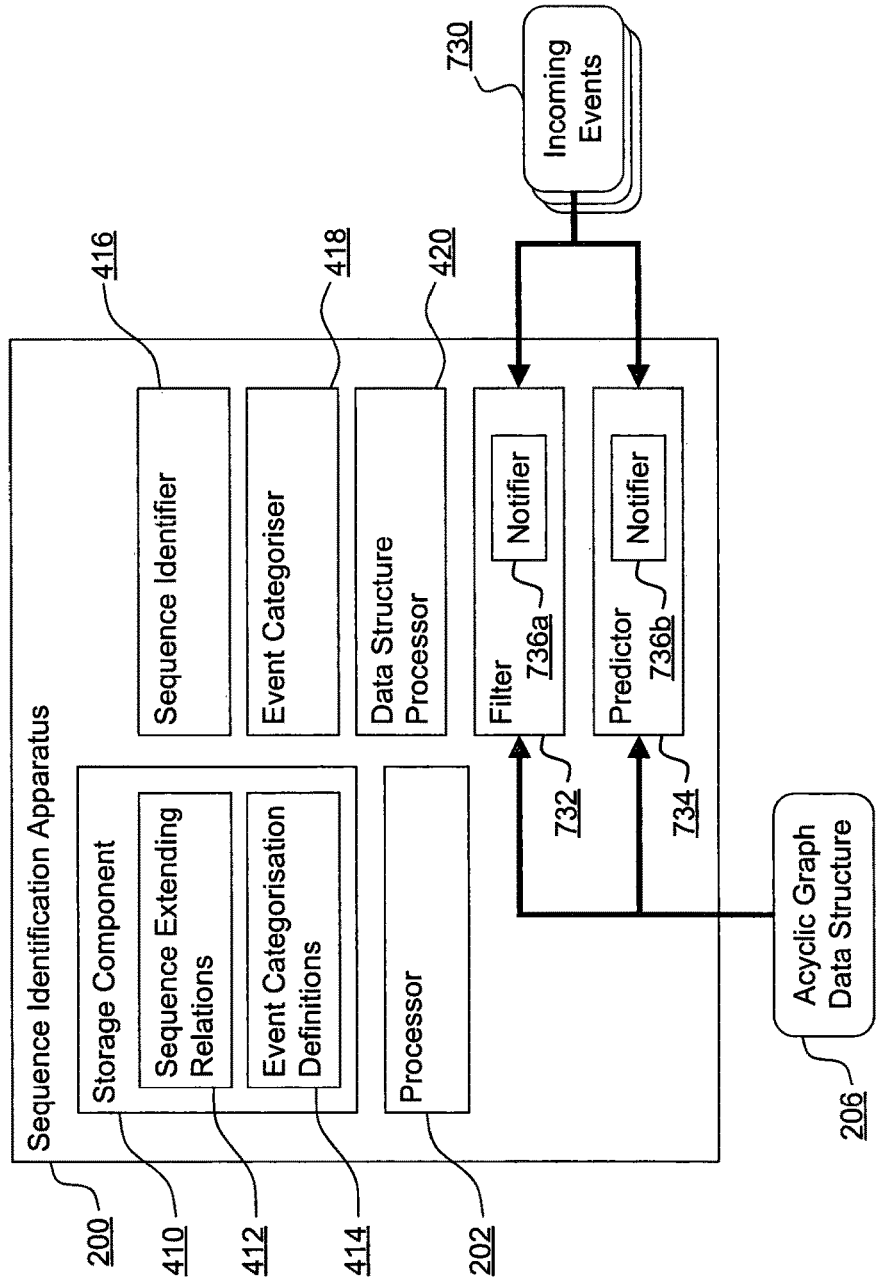

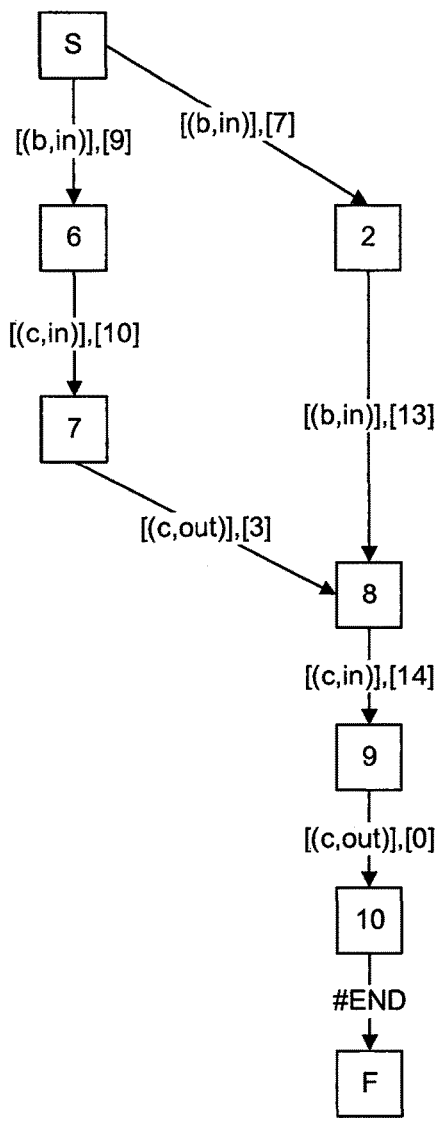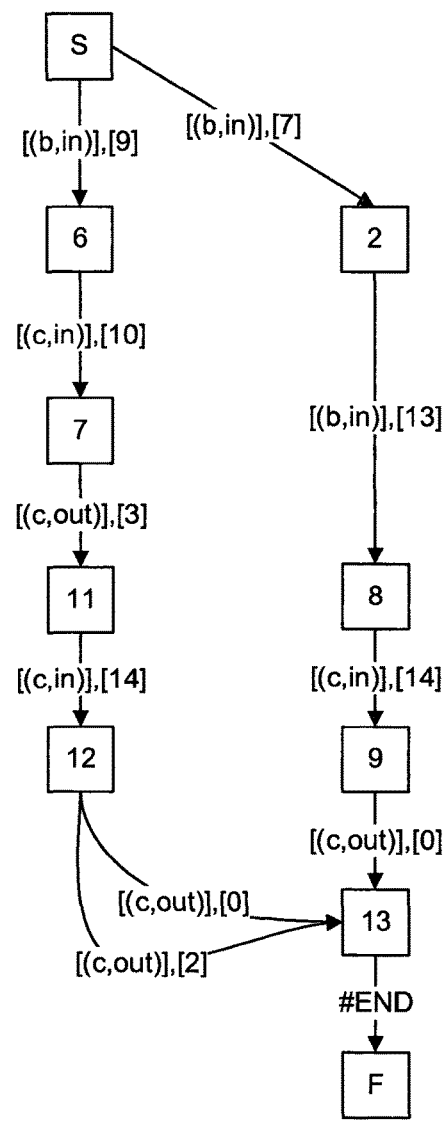

| Virtual Machine Data | OSL | Thread 1 | Thread 2 |
|---|---|---|---|
| | USL | empty | |
| | ISL | empty | |

Thread 1

Stack

| N | C | M | A[0] | A[1] | A[2] | A[3] | A[4] | A[5] |
|---|---|---|---|---|---|---|---|---|
| LS2 | L1 | 1 | 1 | Jan-2 | 07:30 | 10 | b | in |

RematchQueue

| A[0] | A[1] | A[2] | A[3] | A[4] | A[5] |
|---|---|---|---|---|---|
| (...empty...) | | | | | |

Thread 2

Stack

| N | C | M | A[0] | A[1] | A[2] | A[3] | A[4] | A[5] |
|---|---|---|---|---|---|---|---|---|
| - | L6 | 1 | 3 | Jan-2 | 10:20 | 11 | c | in |
| - | L5 | 1 | 2 | Jan-2 | 09:30 | 11 | b | in |

RematchQueue

| A[0] | A[1] | A[2] | A[3] | A[4] | A[5] |
|---|---|---|---|---|---|
| (...empty...) | | | | | |

FIGURE 18

| Virtual Machine Data | OSL | Thread 1 | Thread 2 |
|---|---|---|---|
| | USL | empty | |
| | ISL | empty | |

Thread 1

*Stack*

| N | C | M | A[0] | A[1] | A[2] | A[3] | A[4] | A[5] |
|---|---|---|---|---|---|---|---|---|
| - | L3 | 1 | 6 | Jan-2 | 14:10 | 10 | c | in |
| - | L2 | 1 | 5 | Jan-2 | 13:30 | 10 | b | in |
| LS2 | L1 | 1 | 1 | Jan-2 | 07:30 | 10 | b | in |

*RematchQueue*

| A[0] | A[1] | A[2] | A[3] | A[4] | A[5] |
|---|---|---|---|---|---|
| | | (...empty...) | | | |

Thread 2

*Stack*

| N | C | M | A[0] | A[1] | A[2] | A[3] | A[4] | A[5] |
|---|---|---|---|---|---|---|---|---|
| - | L13 | 1 | 7 | Jan-2 | 14:10 | 11 | c | in |
| - | L12 | 1 | 4 | Jan-2 | 13:20 | 11 | c | out |
| - | L6 | 1 | 3 | Jan-2 | 10:20 | 11 | c | in |
| - | L5 | 1 | 2 | Jan-2 | 09:30 | 11 | b | in |

*RematchQueue*

| A[0] | A[1] | A[2] | A[3] | A[4] | A[5] |
|---|---|---|---|---|---|
| | | (...empty...) | | | |

FIGURE 19

| Virtual Machine Data | OSL | Thread 2 |
|---|---|---|
| | USL | Thread 1 |
| | ISL | empty |

Thread 1

*Stack*

| N | C | M | A[0] | A[1] | A[2] | A[3] | A[4] | A[5] |
|---|---|---|---|---|---|---|---|---|
| (...empty...) | | | | | | | | |

*RematchQueue*

| A[0] | A[1] | A[2] | A[3] | A[4] | A[5] |
|---|---|---|---|---|---|
| 8 | Jan-2 | 14:40 | 10 | b | in |
| 6 | Jan-2 | 14:10 | 10 | c | in |
| 5 | Jan-2 | 13:30 | 10 | b | in |
| 1 | Jan-2 | 07:30 | 10 | b | in |

Thread 2

*Stack*

| N | C | M | A[0] | A[1] | A[2] | A[3] | A[4] | A[5] |
|---|---|---|---|---|---|---|---|---|
| - | L13 | 1 | 7 | Jan-2 | 14:10 | 11 | c | in |
| - | L12 | 1 | 4 | Jan-2 | 13:20 | 11 | c | out |
| - | L6 | 1 | 3 | Jan-2 | 10:20 | 11 | c | in |
| - | L5 | 1 | 2 | Jan-2 | 09:30 | 11 | b | in |

*RematchQueue*

| A[0] | A[1] | A[2] | A[3] | A[4] | A[5] |
|---|---|---|---|---|---|
| (...empty...) | | | | | |

FIGURE 20

| Virtual Machine Data | OSL | Thread 3 |
| --- | --- | --- |
| | USL | Thread 1 |
| | ISL | Thread 2 |

Thread 1

Stack

| N | C | M | A[0] | A[1] | A[2] | A[3] | A[4] | A[5] |
| --- | --- | --- | --- | --- | --- | --- | --- | --- |
| (...empty...) | | | | | | | | |

RematchQueue

| A[0] | A[1] | A[2] | A[3] | A[4] | A[5] |
| --- | --- | --- | --- | --- | --- |
| 8 | Jan-2 | 14:40 | 10 | b | in |
| 6 | Jan-2 | 14:10 | 10 | c | in |
| 5 | Jan-2 | 13:30 | 10 | b | in |
| 1 | Jan-2 | 07:30 | 10 | b | in |

Thread 2

Stack

| N | C | M | A[0] | A[1] | A[2] | A[3] | A[4] | A[5] |
| --- | --- | --- | --- | --- | --- | --- | --- | --- |
| - | <E> | 1 | 9 | Jan-2 | 15:00 | 11 | c | out |
| - | L13 | 1 | 7 | Jan-2 | 14:10 | 11 | c | in |
| - | L12 | 1 | 4 | Jan-2 | 13:20 | 11 | c | out |
| - | L6 | 1 | 3 | Jan-2 | 10:20 | 11 | c | in |
| - | L5 | 1 | 2 | Jan-2 | 09:30 | 11 | b | in |

RematchQueue

| A[0] | A[1] | A[2] | A[3] | A[4] | A[5] |
| --- | --- | --- | --- | --- | --- |
| (...empty...) | | | | | |

Thread 3

Stack

| N | C | M | A[0] | A[1] | A[2] | A[3] | A[4] | A[5] |
| --- | --- | --- | --- | --- | --- | --- | --- | --- |
| - | L5 | 1 | 10 | Jan-3 | 09:00 | 12 | b | in |

RematchQueue

| A[0] | A[1] | A[2] | A[3] | A[4] | A[5] |
| --- | --- | --- | --- | --- | --- |
| (...empty...) | | | | | |

FIGURE 21

| Virtual Machine Data | OSL | empty | | |
|---|---|---|---|---|
| | USL | Thread 1 | Thread 6 | |
| | ISL | Thread 2 | Thread 3 | Thread 4 |

| Thread 1 | ... as figure 20 ... |
|---|---|
| Thread 2 | ... as figure 20 ... |

Thread 3

*Stack*

| N | C | M | A[0] | A[1] | A[2] | A[3] | A[4] | A[5] |
|---|---|---|---|---|---|---|---|---|
| - | <E> | 1 | 18 | Jan-3 | 15:10 | 12 | c | out |
| - | L13 | 1 | 16 | Jan-3 | 14:30 | 12 | c | in |
| - | L12 | 1 | 14 | Jan-3 | 13:00 | 12 | c | out |
| - | L6 | 1 | 12 | Jan-3 | 10:20 | 12 | c | in |
| - | L5 | 1 | 10 | Jan-3 | 09:00 | 12 | b | in |

*RematchQueue*

| A[0] | A[1] | A[2] | A[3] | A[4] | A[5] |
|---|---|---|---|---|---|
| (...empty...) | | | | | |

Thread 4

*Stack*

| N | C | M | A[0] | A[1] | A[2] | A[3] | A[4] | A[5] |
|---|---|---|---|---|---|---|---|---|
| - | <E> | 1 | 19 | Jan-3 | 16:50 | 10 | c | out |
| - | L13 | 1 | 17 | Jan-3 | 14:40 | 10 | c | in |
| - | L12 | 1 | 15 | Jan-3 | 14:00 | 10 | c | out |
| - | L6 | 1 | 13 | Jan-3 | 10:40 | 10 | c | in |
| - | L5 | 1 | 11 | Jan-3 | 09:20 | 10 | b | in |

*RematchQueue*

| A[0] | A[1] | A[2] | A[3] | A[4] | A[5] |
|---|---|---|---|---|---|
| (...empty...) | | | | | |

Thread 5

*Stack*

| N | C | M | A[0] | A[1] | A[2] | A[3] | A[4] | A[5] |
|---|---|---|---|---|---|---|---|---|
| (...empty...) | | | | | | | | |

*RematchQueue*

| A[0] | A[1] | A[2] | A[3] | A[4] | A[5] |
|---|---|---|---|---|---|
| 20 | Jan-4 | 06:00 | 12 | b | in |

EFFICIENT EVENT FILTER

PRIORITY CLAIM

The present application is a National Phase entry of PCT Application No. PCT/GB2014/000379, filed Sep. 24, 2014, which claims priority from EP Application No. 13250101.6, filed Sep. 26, 2013, each of which is hereby fully incorporated herein by reference.

TECHNICAL FIELD

The present disclosure relates to sequence identification for events. In particular it relates to efficient filtering of incoming events using a directed acyclic graph representation of event sequences.

BACKGROUND

As the generation of information proliferates, vast quantities of data are created by systems, software, devices, sensors and all manner of other entities. Some data is intended for human review, problem identification or diagnosis, scanning, parsing or mining. As data sets are generated and stored in greater quantities, at greater rates, and with potentially greater levels of complexity and detail, the "big data" problem of storing, handling, processing or using the data arises.

Specifically, it can be problematic to identify meaning within data, or to identify relationships between data items in large or complex data sets. Further, data can be generated in real-time and received by data storage components or data processing components at regular or variable intervals and in predetermined or variable quantities. Some data items are generated over time to indicate, monitor, log or record an entity, occurrence, status, event, happening, change, issue or other thing. Such data items can be collectively referred to as 'events'. Events include event information as attributes and have associated a temporal marker such as a time and/or date stamp. Accordingly, events are generated in time series. Examples of data sets of events include, inter alia: network access logs; software monitoring logs; processing unit status information events; physical security information such as building access events; data transmission records; access control records for secured resources; indicators of activity of a hardware or software component, a resource or an individual; and profile information for profiling a hardware or software component, a resource or an individual.

Events are discrete data items that may or may not have association directly or indirectly with other events. Determining relationships between events requires detailed analysis and comparison of individual events and frequently involves false positive determinations of relationship leading to inappropriate conclusions. Statistical methods such as time-series analysis and machine learning approaches to the modeling of event information are not ideally suited because they require numerical features in many cases, and because they typically seek to fit data to known distributions. There is evidence that human behavior sequences can differ significantly from such distributions—for example, in sequences of asynchronous events such as the sending of emails, exchange of messages, human controlled vehicular traffic, transactions and the like. In the paper "The origin of bursts and heavy tails in human dynamics," (A. L. Barabasi, Nature, pp. 207-211, 2005), Barabasi showed that many activities do not obey Poisson statistics, and consist instead of short periods of intense activity which may be followed by longer periods in which there is no activity.

A related problem with statistical approaches and machine learning is that such approaches generally require a significant number of examples to form meaningful models. Where a new behavior pattern occurs (for example, in network intrusion events) it may be important to detect it quickly (i.e. before a statistically significant number of incidents have been seen). A malicious agent may even change the pattern before it can be detected.

The identification of sequences of events is a widespread and unsolved problem. For example, internet logs, physical access logs, transaction records, email and phone records all contain multiple overlapping sequences of events related to different users of a system. Information that can be mined from these event sequences is an important resource in understanding current behavior, predicting future behavior and identifying non-standard patterns and possible security breaches.

SUMMARY

Embodiments accordingly provide, in a first aspect, a sequence identification apparatus comprising a processor, wherein the apparatus is adapted to access a directed acyclic graph data structure of equivalence classes of events in event sequences identified in a plurality of time-ordered events, and wherein the graph is optimized such that initial and final sub-sequences of event sequences having common equivalence classes are combined in the graph, the apparatus comprising: a code generator adapted to generate executable code corresponding to the graph such that the code includes an instruction sequence for each event classification of the graph, the code sequence for an event classification being adapted to evaluate criteria to determine if an event corresponds to the event classification; an executor adapted to execute the generated executable code such that, in use, the executable code filters incoming time-ordered events based on the graph.

Advantageously, in embodiments the sequence identification apparatus further comprises a sequence identifier adapted to identify the event sequence and the further event sequences based on at least one sequence extending relation defining at least one relation between events, and wherein, in use, the executable code filters incoming time-ordered events satisfying the at least one sequence extending relation.

Advantageously, in embodiments the sequence identifier is implemented as executable code for execution by the executor.

Advantageously, in embodiments the executor provides multiple threads of execution, each thread being used for the execution of instruction sequences corresponding to a different path through the DAG.

Advantageously, in embodiments each of the threads can have one of a: suspended state; an executing state; and a terminated state, wherein the suspended and executing states indicate identification of a partial sequence of events in the incoming time-ordered events based on the graph, and wherein the terminated state indicates one of: an identification of a full sequence of events in the incoming time-ordered events based on the graph; and an unrecognized sequence of events in the incoming time-ordered events based on the graph.

Advantageously, in embodiments the filtered incoming time-ordered events indicates an occurrence of interest by the identification of one of: a partial sequence of events in the incoming time-ordered events based on the graph; and a full sequence of events in the incoming time-ordered events based on the graph.

Advantageously, in embodiments the incoming time-ordered events are events arising from an arrangement of computing components, and the occurrence of interest is a security occurrence, the apparatus further including a notifier for generating a notification of the security occurrence.

Embodiments accordingly provide, in a second aspect, a computer implemented method of sequence identification comprising: accessing a directed acyclic graph data structure of equivalence classes of events in event sequences identified in a plurality of time-ordered events, and wherein the graph is optimized such that initial and final sub-sequences of event sequences having common equivalence classes are combined in the graph, the apparatus comprising: generating executable code corresponding to the graph such that the code includes an instruction sequence for each event classification of the graph, the code sequence for an event classification being adapted to evaluate criteria to determine if an event corresponds to the event classification; executing the generated executable code to filter incoming time-ordered events based on the graph.

Advantageously, in embodiments the executable code is adapted to filter incoming time-ordered events satisfying at least one sequence extending relation defining at least one relation between events in an event sequence.

Advantageously, in embodiments the sequence identifier is implemented as executable code for execution in the executing step.

Advantageously, in embodiments the execution step provides multiple threads of execution, each thread being used for the execution of instruction sequences corresponding to a different path through the DAG.

Advantageously, in embodiments each of the threads can have one of a: suspended state; an executing state; and a terminated state, wherein the suspended and executing states indicate identification of a partial sequence of events in the incoming time-ordered events based on the graph, and wherein the terminated state indicates one of: an identification of a full sequence of events in the incoming time-ordered events based on the graph; and an unrecognized sequence of events in the incoming time-ordered events based on the graph.

Advantageously, in embodiments the filtered incoming time-ordered events indicates an occurrence of interest by the identification of one of: a partial sequence of events in the incoming time-ordered events based on the graph; and a full sequence of events in the incoming time-ordered events based on the graph.

Advantageously, in embodiments the incoming time-ordered events are events arising from an arrangement of computing components, and the occurrence of interest is a security occurrence, the apparatus further including a notifier for generating a notification of the security occurrence.

In accordance with a third aspect, embodiments accordingly provide a computer program element comprising computer program code to, when loaded into a computer system and executed thereon, cause the computer to perform the computer implemented method as described above.

BRIEF DESCRIPTION OF THE DRAWINGS

Embodiments will now be described, by way of example only, with reference to the accompanying drawings, in which:

FIG. 7 is a component diagram of a sequence identification apparatus in use in accordance with an alternative embodiment.

FIG. 12 is a directed acyclic graph representation of a first and second sequences generated in accordance with an exemplary algorithm in an embodiment.

FIG. 13 is a directed acyclic graph representation of a first, second and third sequences generated in accordance with an exemplary algorithm in an embodiment.

FIG. 16 is a flowchart of a method of the sequence identification apparatus of FIG. 15.

FIGS. 17 to 21 depict a status of a virtual machine for an exemplary embodiment of in use for filtering of a sample data set of events.

DETAILED DESCRIPTION

Figure 1:
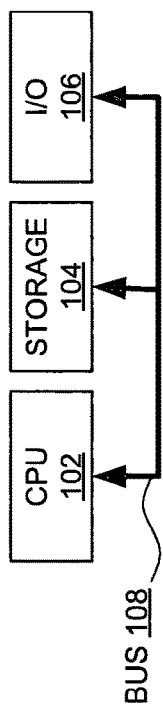
FIG. 1 is a block diagram of a computer system suitable for the operation of embodiments.

FIG. 1 is a block diagram of a computer system suitable for the operation of embodiments of the present invention. A central processor unit (CPU) 102 is communicatively connected to a storage 104 and an input/output (I/O) interface 106 via a data bus 108. The storage 104 can be any read/write storage device such as a random access memory (RAM) or a non-volatile storage device. An example of a non-volatile storage device includes a disk or tape storage device. The I/O interface 106 is an interface to devices for the input or output of data, or for both input and output of data. Examples of I/O devices connectable to I/O interface 106 include a keyboard, a mouse, a display (such as a monitor) and a network connection.

Figure 2:
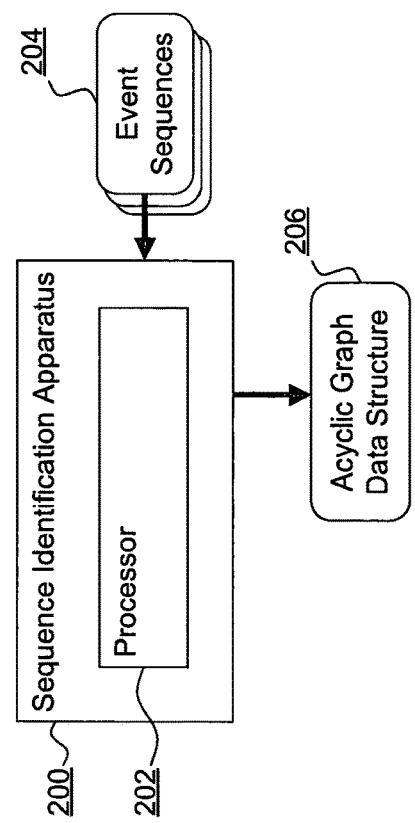
FIG. 2 is a component diagram of a sequence identification apparatus for identifying sequences in a plurality of events in accordance with an embodiment.

FIG. 2 is a component diagram of a sequence identification apparatus 200 for identifying sequences in a plurality of events in accordance with a preferred embodiment of the present invention. The sequence identification apparatus 200 includes a processor 202 for undertaking all or part of the function of the apparatus. Various functions and components of the sequence identification apparatus 200 will be described below with respect to multiple embodiments of the present invention and it will be appreciated by those skilled in the art that the processor 202 may be adapted to carry out, perform, constitute or encapsulate one or more such functions and components in various configurations. For example, the processor 202 can be one or more CPUs such as CPU 102 of a generalized computing device such as that depicted in FIG. 1. Accordingly the particular embodiments depicted herein are purely exemplary and any suitable configuration of components could alternatively be employed.

The sequence identification apparatus 200 is adapted to receive event sequences 204 as sequences of events from a plurality of time-ordered events. The plurality of time-ordered events can be stored in a data structure, table, database or similar, or alternatively the events can be received as a stream of events. The plurality of time ordered events is used to identify the event sequences 204 based on defined sequence extending relations as described below. The event sequences 204 can be determined by a component external to the sequence identification apparatus 200, such as an event sequence identifier, or alternatively the event sequences 204 can be determined by the sequence identification apparatus 200 itself.

The sequence identification apparatus 200 is further adapted to determine an equivalence class for each event in each of the event sequences 204. An equivalence class is a class or type of event defined by one or more event categorization definitions and serves to classify or categorize events. In one embodiment the sequence identification apparatus 200 is adapted to determine the equivalence class itself for each event, based on one or more event categorization definitions as described below. In an alternative embodiment, the sequence identification apparatus 200 determines an equivalence class for an event by receiving an equivalence class for the event from a component external to the sequence identification apparatus 200.

The sequence identification apparatus 200 is further adapted to generate a directed acyclic graph (DAG) data structure 206 as a data structure representation of equivalence classes for a first one of the event sequences 204. For example, the DAG data structure 206 can be a data structure stored in a storage 104 of a computer system, such as a storage associated or comprised with the sequence identification apparatus 200. In one embodiment the DAG data structure 206 is stored using data structure elements as nodes having memory pointers for providing links between nodes as edges of the DAG. Exemplary embodiments of the DAG data structure 206 are detailed below.

The sequence identification apparatus 200 is further adapted to add a representation of one or more further event sequences 204 to the DAG data structure. Thus, the sequence identification apparatus 200 receives one or more further event sequences 204 and modifies the DAG data structure 206 to include a representation of such further event sequences within the DAG. Equivalence classes for events in such further event sequences can be common. For example, equivalence classes for events at a beginning of a first event sequence can be common with equivalence classes for events at a beginning of a second event sequence. The sequence identification apparatus 200 combines such common sub-sequences represented in the DAG data structure 206 such that relationships between the first and second event sequences based on sub-sequences of events having common equivalence classes are represented in the DAG data structure 206. The sequence identification apparatus 200 is adapted to combine equivalence class representations in the DAG data structure 206 for initial and final sub-sequences of event sequences having common equivalence classes ('initial' being at the beginning of an event sequence, and 'final' being at the end of an event sequence).

Figure 3:
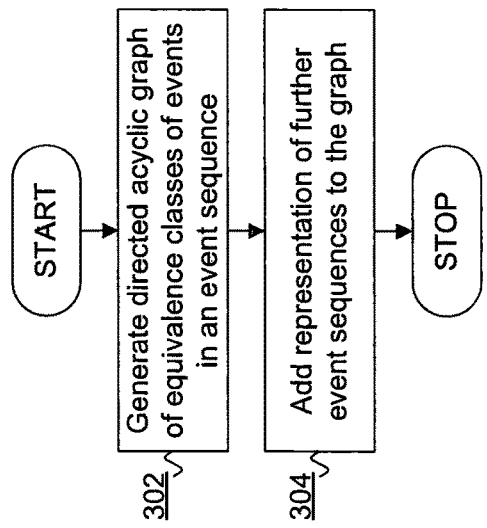
FIG. 3 is a flowchart of a method of the sequence identification apparatus of FIG. 2 in accordance with an embodiment.

FIG. 3 is a flowchart of a method of the sequence identification apparatus 200 of FIG. 2 in accordance with an embodiment. Initially, at 302, the sequence identification apparatus 200 generates a DAG data structure 206 of equivalence classes of events in an event sequence 204. Subsequently, at 304, the sequence identification apparatus 200 adds representations of further event sequences 204 to the DAG data structure 206. The addition, at 304, includes combining equivalence class representations in the DAG data structure 206 as described above.

The DAG data structure 206 generated by the sequence identification apparatus 200 includes a directed representation of equivalence classes for each of the event sequences 204. Such a representation is particularly advantageous for processing subsequently received streams of time-ordered events. Using such a DAG data structure 206 it is possible to efficiently filter incoming streams of time-ordered events to identify known sequences of events by traversing the DAG for new events. The DAG data structure 206 is particularly beneficial because it represents equivalence classes of events and so a filtering process based on the DAG is not hindered by an interpretation of the particular features of individual events, either in the plurality of events used to generate the DAG or a stream of incoming events. Further, such an approach to traversing the DAG for incoming events can be used to efficiently identify new sequences of events not correlating to the event sequences represented by the DAG. Such identifications can be useful where new sequences need to be identified. Yet further, the DAG data structure 206 allows for an efficient identification of new sequences having sub-sequences in common with existing sequences, such as new sequences of events having initial or final sub-sequences of events having common equivalence classes.

The DAG data structure 206 is further suitable for predicting future classes or types of event, and by extrapolation, the DAG can be used to predict one or more future events based on the event sequences used to generate the DAG. Where a path through the DAG data structure 206 is partially traversed in response to a sequence of incoming time-ordered events, one or more potential subsequent event classifications can be predicted based on the next elements in the DAG. Further, attributes for existing events in a sequence leading to such partial traversal of a path through the DAG can be used to generate one or more predicted events. Such predictions can be additionally based on sequence extending relations to inform a determination of attribute values for one or more predicted future events. For example, where the DAG data structure 206 represents event sequences of known attacks in a computer network intrusion detection system, with each event corresponding to a network action such as a network request, response, transmitted packet or other network occurrence, the DAG can be used to predict one or more future events from an incoming stream of events to identify a potential new attack before it occurs. Such early identification can be effective even if the incoming sequence of events is used to only partially traverse a path through the DAG. An extent of similarity of the equivalence classes for an incoming sequence of events with paths of equivalence classes in the DAG can be determined and, reactive to a threshold extent, predicted attacks can be identified.

The DAG data structure 206 is further suitable for identifying entities associated with events that may be related based on similarity of paths through the DAG data structure 206. For example, events relating to wholly different entities but being represented in the DAG using common graphs of event classifications (such as combined graphs or subgraphs) can identify a relationship between the entities. Thus, where entities constitute physical objects, devices or people and events indicate a behavior, action, change or other occurrence relating to the entity, the DAG can be used to group entities due to event classification commonality. For example, time-stamped events can relate to employees accessing resources using a security facility, such as access to a secure building via a badge-locked door, or access to a secure network via an authentication system. Such events can include an indication of a type of occurrence, such as an "entry occurrence" and an "exit occurrence" indicating commencement and cessation of access to the resource. Further, events can include an identification of a resource being accessed, such as a building or network identifier. Sequences of such events can be identified using sequence extending relations between events such as identity of employee identifier and a temporal limitation. A DAG data structure 206 generated by the sequence identification apparatus 200 models equivalence classes of events in such sequences. Such classes can include, for example, classes characterized by the type of occurrence ("entry" or "exit"), the time of day (e.g. "morning" or "afternoon") and an identifier of a resource (building or network identifier). As sequences of events are represented in the DAG data structure 206, event sequences relating to different employees may be found to overlap in the DAG and are accordingly combined. Such employees can be identified as similar based on such combining. For example, employees who enter a particular building in the morning and leave the same building in the afternoon can be identified as a group of employees who work at only a single site. Other different such groups can also be discerned based on the DAG. The identification of groups of entities can be valuable in security applications where entities grouped with known threats can be subject to close scrutiny.

Figure 4:
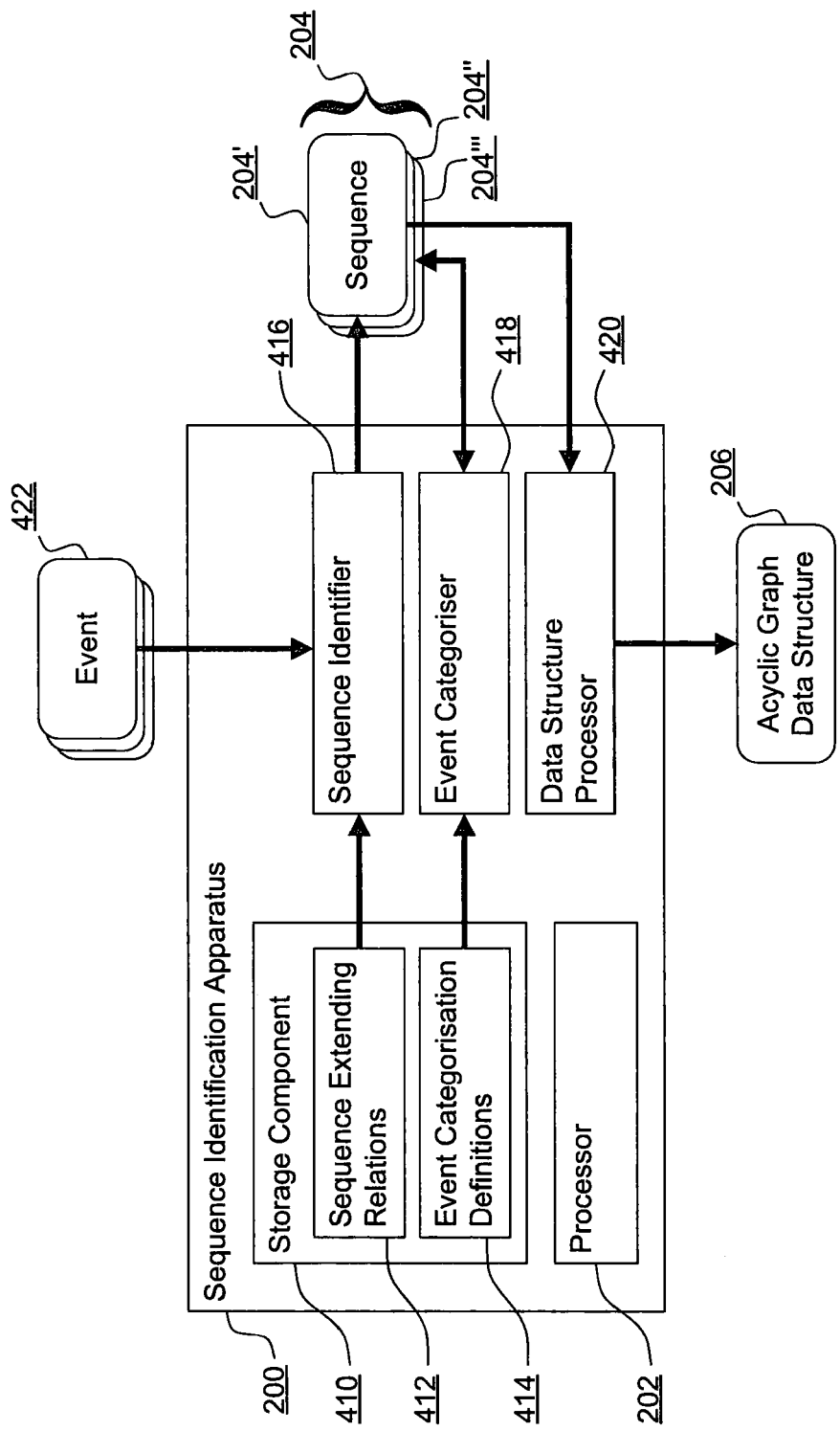
FIG. 4 is a component diagram of a sequence identification apparatus in use in accordance with one embodiment.

FIG. 4 is a component diagram of a sequence identification apparatus 200 in use in accordance with one embodiment. Certain of the elements of FIG. 4 are common with FIG. 2 as previously described and these will not be repeated here. The embodiment of FIG. 4 illustrates one exemplary implementation of the arrangement of FIG. 3 for the generation of the DAG data structure 206. The sequence identification apparatus 200 of FIG. 4 is adapted to receive a plurality of time-ordered events 422. Each event in the plurality of events 422 is a data item, data structure, message, record or other suitable means for recording an occurrence of the type, inter alia, previously described. Events 422 constitute data input into the sequence identification apparatus 200 and can be stored in a data store associated with, or communicable with, the apparatus 200. For example, the events 422 can be stored in a table data structure, database, file, message list or other suitable format. Alternatively, the events 422 can be received by the apparatus 200 individually or in batches over a communication mechanism such as a software or hardware interface or a network. Each of the events 422 includes temporal information such as a time and/or date stamp to indicate the position of the event in the time-ordered plurality of event. Such temporal information can be absolute or relative. Each of the events 422 has a plurality of fields, columns, elements, values, parameters or data items that shall be collectively referred to as attributes. Attributes are most preferably identified by an attribute name, though an offset, address, indicator, identifier, look-up or other suitable means for consistently referencing a particular attribute of an event are also possible. In one embodiment, attributes are common to all events 422 such that each event has all attributes, and the domain of each attribute is the same for all events. In an alternative embodiment some events have attributes in addition to common attributes and a subset of attributes used for sequence generation and event classification are common to all events.

The sequence identification apparatus 200 further includes a storage component 410 storing one or more sequence extending relations 412 and one or more event categorization definitions 414. The sequence extending relations 412 are relations between events 422 based on common event attributes. In an event sequence 204, each event is related to a temporally preceding event by one or more sequence extending relation 412. A first event in an event sequence is not related to a preceding event. Thus, the sequence extending relations 412 serve to define a relationship between an event and a temporally later event to constitute all or part of an event sequence. One or more of the sequence extending relations 412 can be implemented as criteria, the satisfaction of which by a pair of events determines a relationship between the events. In one embodiment the criteria can be determinative of a relation. In an alternative embodiment, one or more of the sequence extending relations 412 can be implemented as a measurement of characteristics of a pair of events to determine a relationship between the events. In this way a fuzzy relation can be defined such that a relationship between events is based on one or more measures of characteristics based on attribute values of the events and one or more conditions or criteria relating to such measures. Thus, in such embodiments, one or more sequence extending relations 412 are defined such that a relation between events is determined based on a measure of a level of satisfaction of relational criteria and responsive to the measure meeting a predetermined threshold.

The event categorization definitions 414 define classes or types of events known as equivalence classes or event categories. Equivalence classes provide a mechanism for categorizing multiple events as "equivalent" events according to the event categorization definitions 414. The event categorization definitions 414 are based on event attributes common to all events. Advantageously, each of the event categorization definitions 414 is defined by at least one criterion based on a plurality of common attributes. One or more of the event categorization definitions 414 can be implemented as one or more criteria, the satisfaction of which by an event can be used to determine that the event belongs to an equivalence class. In one embodiment the criteria can be determinative of a categorization of an event. In an alternative embodiment, one or more of the event categorization definitions 414 can be implemented as a measurement of characteristics of an event based on attributes of the event to determine one or more equivalence classes for the event. In this way a fuzzy association with equivalence classes can be defined such that an association between an event and equivalence classes is based on one or more measures of characteristics based on attribute values of the event and one or more conditions or criteria relating to such measures. Thus, in such embodiments, one or more event categorization definitions 414 are defined such that an equivalence class for an event is determined based on a measure of a level of satisfaction of the event with one or more criteria.

In use the sequence extending relations 412 are received by a sequence identifier 416. The sequence identifier is a hardware, software or firmware component adapted to identify event sequences 204 in the plurality of time-ordered events 422 based on the sequence extending relations 412. In one embodiment the sequence identifier 416 processes each event in the plurality of events 422 and applies criteria associated with each of the sequence extending relations 412 to determine if the event is related to a previous event. Related events are stored as event sequences 204 which can grow as more events in the plurality of events 422 are processed. It is conceivable that some events are not related to previous events and these may constitute the beginning of a new sequence. Further, some events may not appear in any of the sequences 204. Such events may be identified or flagged for further consideration. It will be appreciated by those skilled in the art that the sequence identifier 416 is operable to identify, monitor and track multiple potential or actual sequences contemporaneously so as to identify all event sequences 204 existing in the plurality of events 422 based on the sequence extending relations 412.

Further, in use the event categorization definitions 414 are received by an event categorzier 418. The Event categorzier is a hardware, software or firmware component adapted to determine an equivalence class for each event in each of the event sequences 204. In one embodiment the event categorzier 418 receives processes each event in each event sequence 204 and applies criteria associated with each of the event categorization definitions 414 to determine an appropriate equivalence class.

The sequence identification apparatus 200 further comprises a data structure processor 410 as a hardware, software or firmware component adapted to generate a DAG data structure 206 for each event in each of the event sequences 204. In one embodiment the DAG data structure 206 includes nodes and edges such that each edge corresponds to an equivalence class for an event in a sequence. Thus, in use, the data structure processor 420 generates an initial DAG data structure 206 for a first event sequence 204' including a plurality of graph edges each corresponding to an equivalence class for an event in the sequence. The edges connect nodes representative of, but not specifically associated with, the sequence extending relations 410 for the event sequence 204'. Consequently, after processing the first event sequence 204', the DAG data structure 206 is generated as a graph having a single straight path from a start node to an end node, with edges corresponding to equivalence classes for each event in the sequence joining nodes along the path. Subsequently, the data structure processor 420 processes further event sequences 204", 204''' adding a representation of each further event sequence 204", 204''' to the DAG data structure 206. In particular, where the data structure processor 420 determines that one or more initial and final subsequences of the first sequence 204' and further sequences 204", 204''' have common event categorizations, the subsequences are combined in the DAG data structure 206. The DAG is therefore a minimal representation of the equivalence classes of the event sequences 204 where event sequences having sub-sequences of events with a series of common equivalence classes are merged and represented only once in the DAG data structure 206. Accordingly, the DAG data structure 206 can branch and join at points between a start node and an end node to define paths between the start node and end node.

It will be appreciated by those skilled in the art that, while the processor 202, sequence identifier 416, event categorizer 418 and data structure processor 420 are illustrated as separate components in FIG. 4, any or all of at least these components can be combined, merged, or further subdivided in embodiments. For example, the sequence identifier 416 and the event categorizer 420 can be a single component. Further, the data structure processor 420 may be omitted with its functions performed by the processor 202 or any other suitable component of the sequence identification apparatus 200. It will further be appreciated that, while the storage component 410 is illustrated as being integral to the apparatus 200, the storage may alternatively be provided external to the apparatus 200 or as an integral part of a subcomponent of the apparatus 200. For example, the storage component 410 can be provided and maintained at an external device or apparatus communicatively connected to the sequence identification apparatus 200, such as by a software and/or hardware interface or a network.

Figure 5:
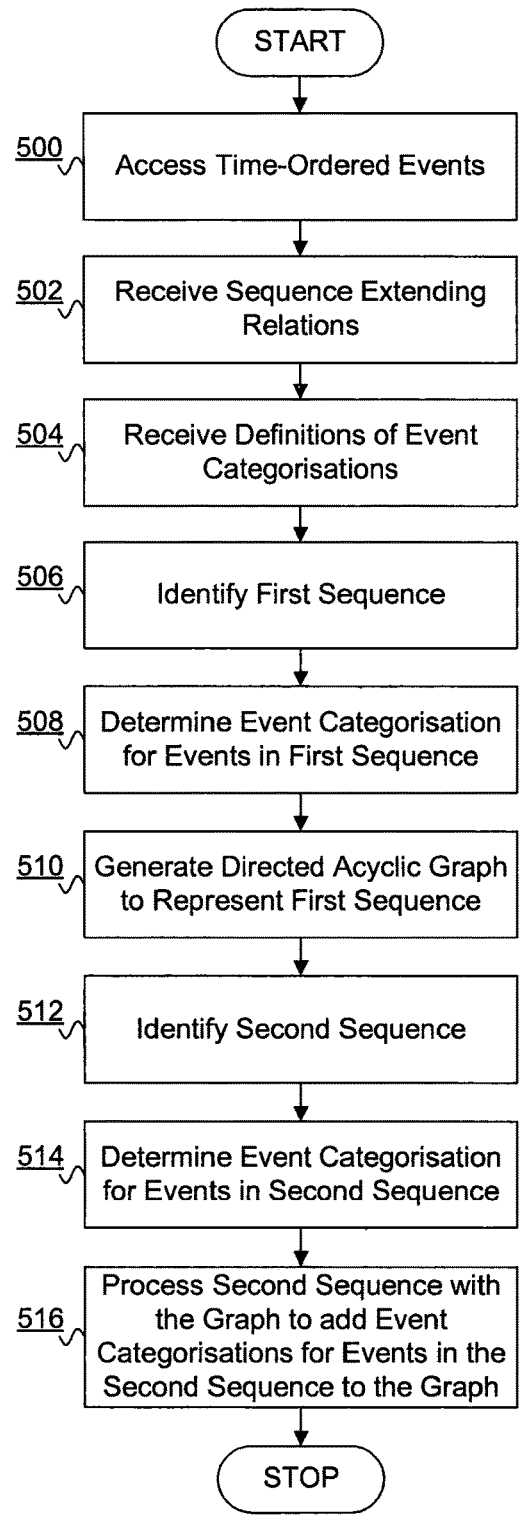
FIG. 5 is a flowchart of a method of the sequence identification apparatus of FIG. 4 in accordance with an embodiment.

FIG. 5 is a flowchart of a method of the sequence identification apparatus 200 of FIG. 4 in accordance with one embodiment of the present invention. Initially, at 500, the sequence identifier 416 accesses time ordered plurality of events 422 such as by accessing a data store, database or table containing event records. At 502 the sequence identifier 416 receives sequence extending relations 412 from the storage component 410. At 504 the event categorizer 418 receives event categorization definitions 414 from the storage component 410. At 506 the sequence identifier 416 identifies a first event sequence 204' based on the sequence extending relations 412. At 508 the event categorizer 418 determines an equivalence class for each event in the first event sequence 204'. At 510 the data structure processor 420 generates a DAG data structure 206 of equivalence classes to represent the first sequence 204'. Subsequently, at 512, the sequence identifier 416 identifies at least one further event sequence 204" as a second event sequence 204". At 514 the event categorizer 418 determines an equivalence class for each event in the second event sequence 204". At 516 the data structure processor 420 processes the second event sequence 204" with the DAG data structure 206 to add equivalence classes for events in the second event sequence 204" to the DAG data structure 206.

It will be appreciated that the particular ordering of the flowchart tasks illustrated in FIG. 5 and described above is not limiting and any other suitable tasks and/or order of tasks could alternatively be employed.

Figure 6A:
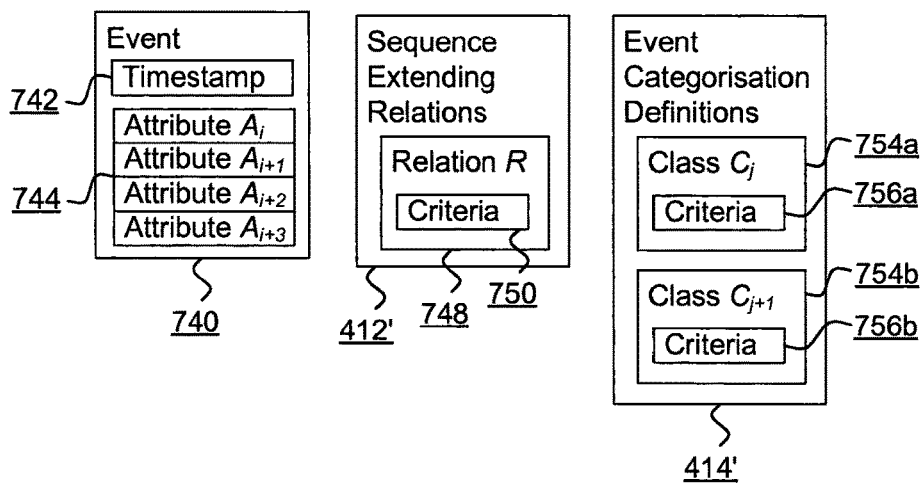
FIGS. 6a to 6e are component diagram illustrating exemplary data structures employed and generated by the embodiments of FIGS. 2 to 5.

FIGS. 6a to 6e are component diagrams illustrating exemplary data structures employed and generated by the embodiments of FIGS. 2 to 5. FIG. 6a illustrates an exemplary event data structure 740. The event 740 includes a timestamp 742 as an example of a temporal indicator. The timestamp 742 can indicate a time of generation, dispatch, receipt or other point in time applied consistently by all events in a plurality of events 422. The timestamp 742 provides a means by which the time-ordered nature of a plurality of events 422 can be determined and confirmed. For example, if a plurality of events 422 is not time-ordered, the timestamp 742 can be used to sort the events to provide a time-ordered plurality of events 422. The event 740 further includes a plurality of common attributes 744. The attributes 744 are common among all events in a plurality of events 422. All or a subset of the attributes 744 are used to define sequence extending relations 412. Further, all or a subset of the attributes 744 are used to define event categorization definitions 414. Each of the attributes 744 has a domain common to all events.

FIG. 6a further illustrates an exemplary sequence extending relations data structure 412'. The sequence extending relations data structure 412' includes a relation 748 defined by way of one or more criteria 750 based on event attributes 744. FIG. 6a further illustrates an exemplary event categorization definitions data structure 414'. The event categorization definitions data structure 414' includes a plurality of equivalence class definitions 754a, 754b each being defined by way of one or more criteria 756a, 756b based on event attributes 744.

Figure 6B:
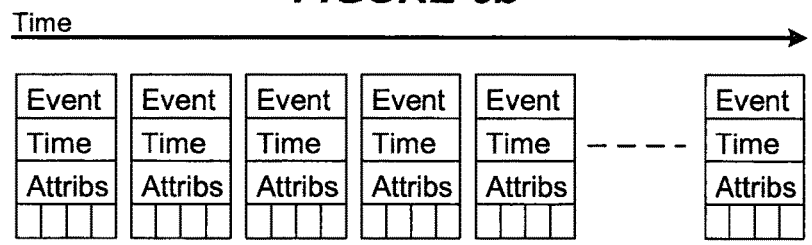

FIG. 6b illustrates a plurality of time-ordered events 422, each including a timestamp 742 and attributes 744. The plurality of events 422 are illustrated as a stream of events which is one way the events can be received by the sequence identification apparatus 200. The plurality of events 422 can equally be stored in a table or other suitable data structure as described above.

Figure 6C:
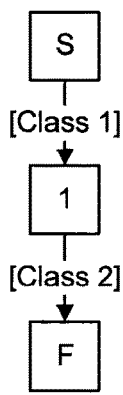

FIG. 6c illustrates a first exemplary DAG data structure. The DAG of FIG. 6c represents equivalence classifications for at least one event sequence of two events, the second event being related to the first event by a sequence extending relation. A first event in the event sequence is represented as having an equivalence class "Class 1". A second event in the event sequence is represented as having an equivalence class "Class 2". The graph is delimited by predefined start and end nodes labeled "S" and "F" respectively. The relation between the events is indicated by the node "1" and the temporal relationship between the events in the event sequence provides a direction for the edges (equivalence classes) of the graph. Thus, FIG. 6c provides a DAG representation of an event sequence. Other event sequences having different events but having events with equivalence classifications according to the DAG of FIG. 6c can be said to be similar to the event sequence that was used to generate FIG. 6c.

Figure 6D:
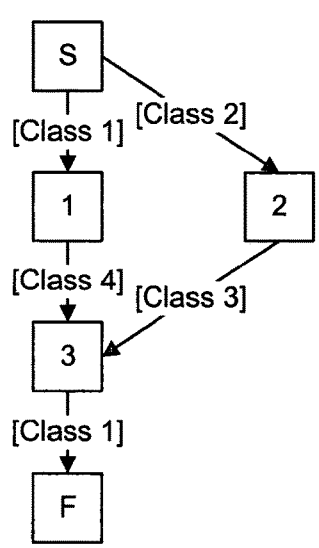

FIG. 6d illustrates a second exemplary DAG data structure. The DAG of FIG. 6d shares some features with FIG. 6a, such as the start and end nodes. The DAG of FIG. 6d represents equivalence classifications for at least two event sequences, each of three events in length. A first event sequence includes events in time order having equivalence classes "Class 1", "Class 4" and "Class 1" respectively. A second event sequence includes events in time order having equivalence classes "Class 2", "Class 3" and "Class 1". The two event sequences overlap at sub-sequence at the end of each sequence, since the last event in both event sequences has equivalence class "Class 1". Thus, the DAG of FIG. 6d combines edges for the last event in each sequence between the node labeled "3" and the end node "F".

Figure 6E:
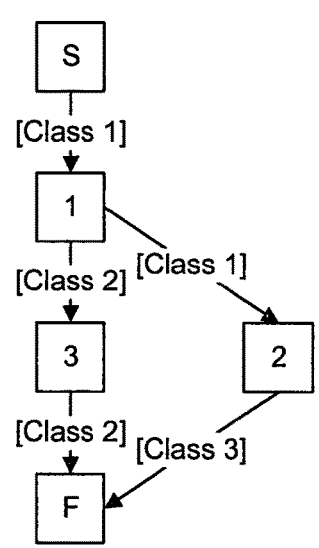

FIG. 6e illustrates a third exemplary DAG data structure. The DAG of FIG. 6e represents equivalence classifications for at least two event sequences where each of the event sequences overlap at a sub-sequence at the beginning of each sequence. Events at the beginning of both sequences are of equivalence class "Class 1". Thus, the DAG of FIG. 6e combines edges for the first event in each sequence between the start node "S" and the node labeled "1".

Advantageously, the edges of the DAG data structure 206 are associated with events used in the generation of the DAG data structure 206 such that it is possible to relate an equivalence class representation in a DAG to events categorized to the equivalence class in a corresponding event sequence. For example, the DAG data structure 206 can be rendered for visualization to a user for analysis, review or other reasons. A user can navigate to specific events in event sequences based on edges in the DAG using such an association. It will be apparent to those skilled in the art that the association can be unidirectional (e.g. DAG edges reference events or events reference DAG edges) or bidirectional.

FIG. 7 is a component diagram of a sequence identification apparatus 200 in use in accordance with an alternative embodiment. Many of the features of FIG. 7 are identical to those described above with respect to FIGS. 2 and 4 and these will not be repeated here. The sequence identification apparatus 200 of FIG. 7 further includes a filter 732 as a hardware, software or firmware component adapted to receive and filter incoming time-ordered events 730 based on a DAG data structure 206. The DAG data structure 206 is predefined according to the components, methods and techniques described above with respect to FIGS. 2 to 6. The incoming events 730 are new events for filtering by the filter 732. The filter 732 constitutes a component for employing a defined DAG data structure 206 to filter new incoming events 730. For example, the filter 732 is suitable for efficiently filtering an incoming stream of time-ordered events 730 to identify event sequences in the incoming stream of events 730 corresponding to sequences known from the DAG data structure 206. This is achieved by the filter 732 traversing the DAG data structure 732 for events in the incoming stream 730 where incoming events 730 satisfy sequence extending relations 412.

Thus, on receiving a new event from the stream of incoming events 730, the filter 732 operates in two respects: firstly, the filter 732 determines if the new event is related to a previously received event in accordance with the sequence extending relations 412; and secondly, the filter 732 determines if the new event corresponds to an equivalence class represented in the DAG data structure 206 as part of a path traversed through the DAG. In the first respect, the filter 732 can be adapted to store a record of all events as they are received in order to seek and identify previously received events with which a new event may be related. In the second respect, the filter 732 can be adapted to undertake and record potentially numerous traversals of the DAG data structure 206 simultaneously, each traversal corresponding to all partially received event sequences arising in the stream of incoming events 730. Thus the filter 730 is preferably provided with a memory, store, data area or similar for storing information about received events and for storing DAG traversal information for all partially received event sequences.

In this way the filter 732 provides an efficient way to identify known event sequences in the stream of incoming events 730 even where the event sequence arrives interspersed with other events or event sequences. Further, the filter 732 can be used to efficiently identify new sequences of events not correlating to the event sequences represented by the DAG. Such identifications can be useful where new sequences need to be identified, such as for addition to the DAG data structure 206. Alternatively, the identification of such new sequences can be used to identify atypical, suspicious, questionable or otherwise interesting sequences of events. For example, where a DAG data structure 206 is defined to represent acceptable sequences of events, a new sequence not conforming to any sequence represented by the DAG can be identified by the filter 732. It will be appreciated by those skilled in the art that the filter 732 can be adapted to traverse the DAG data structure 206 starting at a node or edge not at the beginning (or start) of the DAG such that new event sequences partially corresponding to a sub-sequence represented in the DAG data structure 206 can be identified.

In one embodiment the filter 732 is provided with a notifier 736a as a hardware, software or firmware component for generating a notification in response to the processing of the stream of incoming events 730. For example, where the filter 732 identifies a new event sequence not corresponding to any sequence represented by the DAG data structure 206, the notifier 736a can generate an appropriate notification. Additionally or alternatively, where the filter 732 identifies an event sequence corresponding or partially corresponding to a sequence represented by the DAG data structure 206, the notifier 736a can generate an appropriate notification.

The sequence identification apparatus 200 of FIG. 7 further includes a predictor 734 as a hardware, software or firmware component adapted to receive incoming time-ordered events 730 and predict one or more equivalent classes for future events or future events themselves based on the predefined DAG data structure 206.

On receiving a new event from the stream of incoming events 730, the predictor 734 operates in three respects: firstly, the predictor 734 determines if the new event is related to a previously received event in accordance with the sequence extending relations 412; secondly, the predictor 734 determines if the new event corresponds to an equivalence class represented in the DAG data structure 206 as part of a path traversed through the DAG; and thirdly the predictor 734 identifies one or more potential next equivalence classes from the DAG based on the path traversed through the DAG. In the first and second respects, the predictor 734 can be adapted to store a record of all events as they are received and undertake and record potentially numerous traversals of the DAG data structure 206 simultaneously, as is the case for the filter 732. Thus the predictor 732 is preferably provided with a memory, store, data area or similar for storing information about received events and for storing DAG traversal information for all partially received event sequences. In the third respect, the predictor 732 is adapted to determine one or more predicted equivalence classes from the DAG as outgoing edges from a current node in a traversal of the DAG data structure 206 for an event sequence received in the stream of incoming events 730. In the simplest case, the equivalence classes represented by outgoing edges are identified for a predicted future event. In some embodiments the prediction can be more sophisticated as described below.

In one embodiment, when the predictor 732 identifies more than one predicted equivalence class for a future event, the predictor 732 is further adapted to evaluate a most likely of the predicted equivalent classes based on a statistical, semantic or content analysis of the events received in the event sequence leading to the prediction and events used in the definition of the DAG data structure 206. Thus, an event sequence in the stream of incoming events 730 that is statistically, semantically or literally more similar to events used in defining a particular path through the DAG can cause a particular path to be weighted more highly (and therefore more likely) than alternative paths. A predicted next equivalence class can then be determined as a most likely equivalence path.

Further, in some embodiments, the predictor 732 can employ event information, including attribute values, from events in an identified event sequence in the stream of incoming events that lead to a prediction. The event information can be used to generate a new predicted event by populating the predicted event attribute values based on the event information. For example, timestamp information can be predicted based on intervals between events in a current event sequence. Further, sequence extending relations 412 act as constraints on the potential values of attributes in a predicted event such that all predicted attribute values must at least satisfy criteria associated with the sequence extending relations 412. Other attribute values, or ranges or enumerations of values, may also be predicted using similar techniques.

In one embodiment, either or both of the filter 732 and predictor 734 are provided with a notifier 736a, 736b as a hardware, software or firmware component for generating a notification in response to the processing of the stream of incoming events 730. For example, where the filter 732 identifies a new event sequence not corresponding to any sequence represented by the DAG data structure 206, the notifier 736a can generate an appropriate notification. Additionally or alternatively, where the filter 732 identifies an event sequence corresponding or partially corresponding to a sequence represented by the DAG data structure 206, the notifier 736a can generate an appropriate notification. Similarly, the predictor 734 uses the notifier 736b to generate notifications of predicted equivalence classes or events.

For the avoidance of doubt, the stream of time-ordered incoming events 730 that is processed by the filter 732 and/or the predictor 734 is distinct over the plurality of events 422 used to generate the DAG data structure 206. Thus the sequence identification apparatus 200 operates with two sets of events: a first set of events 422 for the generation of the DAG data structure; and a second set of events, incoming events 730, for processing by the filter 732 and/or the predictor 734. It will be appreciated by those skilled in the art that the incoming events 730 can additionally be used to adapt, evolve, modify or supplement the DAG data structure 206 by adding a representation of identified event sequences in the stream of incoming events 730 to the DAG data structure 206 as embodiments might require.

It will be appreciated by those skilled in the art that, while the filter 732 and predictor 734 are illustrated as comprised in the sequence identification apparatus 200, either of the filter 732 or predictor 734 could be omitted. Alternatively, the functions and facilities provided by the filter 732 and predictor 734 can be provided by a single unified component or components subdivided in different ways. Yet further, the functions and facilities provided by the filter 732 and/or predictor 734 can be provided by one or more components external to the sequence identification apparatus 200, such as components in communication with the apparatus 200 by hardware or software interface or over a network.

Figure 8:
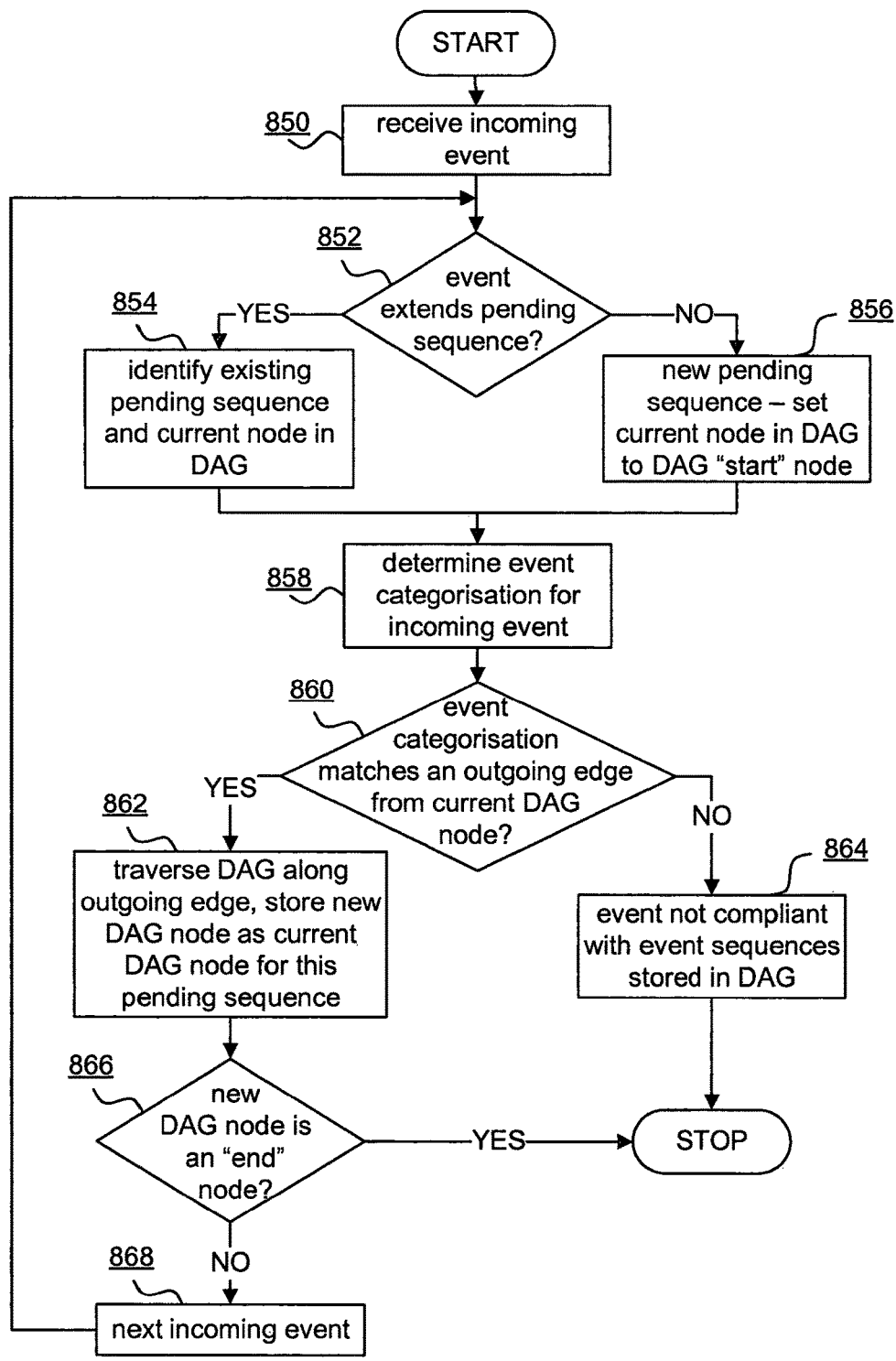
FIG. 8 is a flowchart of a method of the filter of FIG. 7 in accordance with the alternative embodiment.

FIG. 8 is a flowchart of a method of the filter 732 of FIG. 7 in accordance with the alternative embodiment of the present invention. Initially, at 850, the filter 732 receives a new incoming event from the plurality of incoming events 730. At 852 the filter 732 determines if the received incoming event extends an event sequence the filter 732 is currently processing. The determination is based on a record of previously received events, previously identified partial event sequences, and the sequence extending relations 412. If the received event does not extend a previously received event sequence the method records the received event as the start of a potentially new event sequence at 856. In respect of the received event, the traversal of the DAG data structure 206 is initialized to the start node "S".

Alternatively, at 854, if the received event does extend a previously received partial event sequence, the method identifies the previously received partial event sequence and the current node in the DAG data structure 206 in respect of the most recent event received in the partial event sequence.

At 858 the method determines a equivalence classification for the received event. At 860 the method determines if the determined equivalence classification matches an outgoing edge from the current node in the DAG traversal. If the equivalence classification does not match an outgoing edge, step concludes that the received event does not correspond to any of the paths in the DAG and is not compliant with any of the event sequences represented by the DAG and the method terminates.

If the equivalence classification does match an outgoing edge, 862 traverses the DAG data structure 206 along the identified outgoing edge to a new current node in the DAG for the partial event sequence. If 866 determines that the new current node is an end node "F", the method terminates, otherwise the method receives a next incoming event at 868 and iterates to 852.

Figure 15:
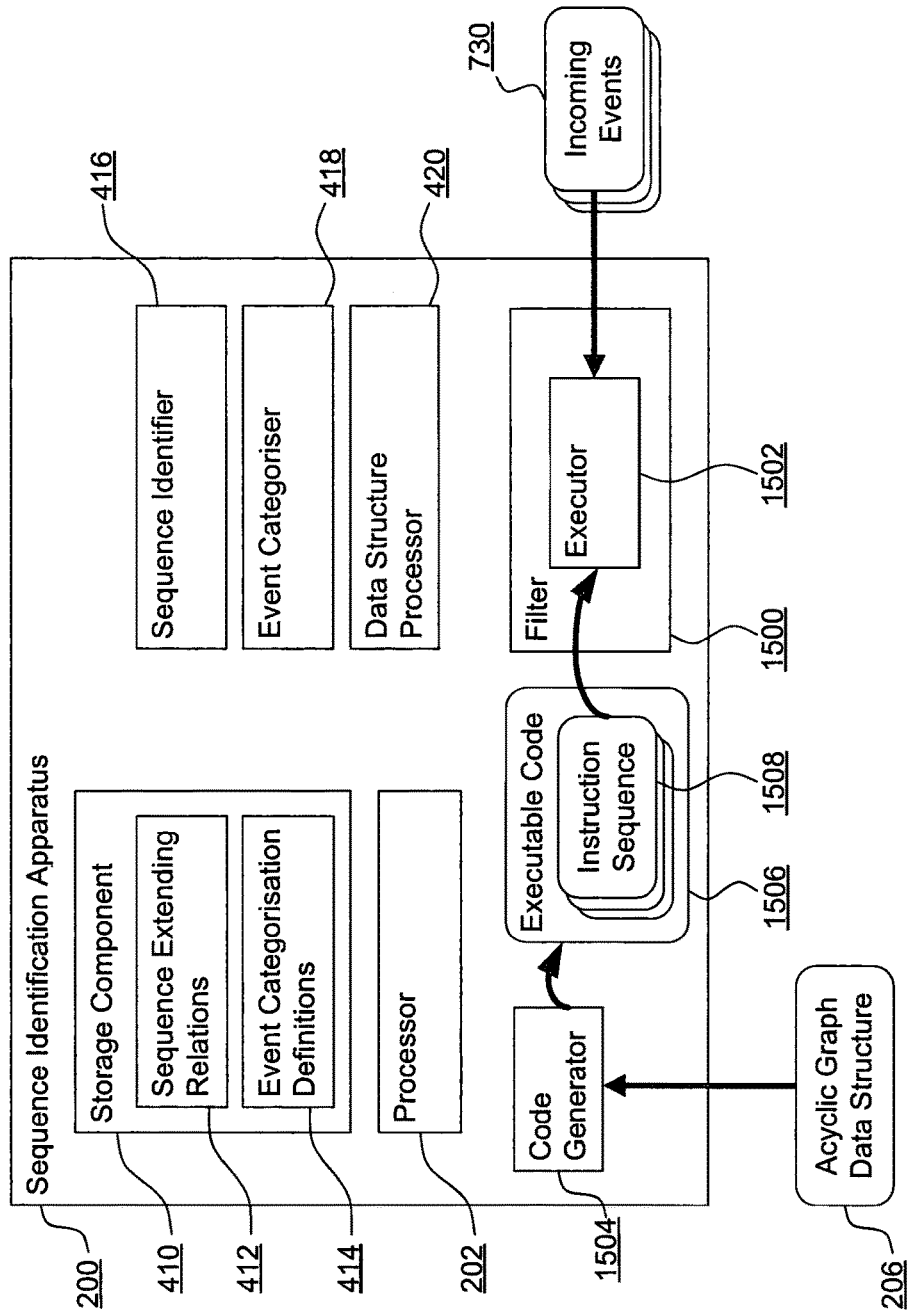
FIG. 15 is a component diagram of a sequence identification apparatus having an efficient filter in accordance with an alternative embodiment.

FIG. 15 is a component diagram of a sequence identification apparatus 200 having an efficient filter 1500 in accordance with an alternative embodiment. Many of the features of FIG. 15 are identical to those described above with respect to FIG. 7 and these will not be repeated here. FIG. 15 includes a filter 1500 adapted to provide generally the facilities of the filter 732 described above with respect to FIGS. 7 and 8. In the embodiment of FIG. 15, a particularly advantageous filter 1500 is illustrated as one embodiment of a filter for incoming time-ordered events 730. The filter 1500 is a hardware, software or firmware component for filtering incoming time-ordered events as previously described. The filter 1500 includes an executor component 1502 as a hardware, software or firmware component for executing executable code 1508 for providing the filtering function of the filter 1500. In one embodiment the executor is a virtual, machine operable to parse and execute instructions from a defined instruction set.

A code generator 1504 is a hardware, software or firmware component adapted to generate the executable code 1506 based on a DAG data structure 206 such that the executable code 1506 includes one or more instruction sequences 1508 corresponding to features of the DAG. In use, executor 1502 executes the executable code 1506 for an incoming event 730 causing the execution of one or more instruction sequences 1508. The instruction sequences 1508 are adapted to determine a state or level of satisfaction of the incoming event 730 with one or more equivalence class criteria for one or more edges of the DAG data structure 206 such that the DAG is traversed by way of the executor 1502 executing instruction sequences 1508 to filter the incoming events 730.

In one embodiment, each instruction sequence 1508 corresponds to a node in the DAG, the instruction sequence 1508 being adapted to test if equivalence class criteria for each outgoing edge of the node is satisfied as a mechanism for identifying a next instruction sequence (node) to be executed. Thus, in this way, the DAG data structure 206 is traversed by execution of instruction sequences corresponding to DAG nodes and testing equivalence class criteria based on, for example, event categorization definitions, to traverse the DAG for incoming events 730. Accordingly, the execution of the executable code 1506 by the executor 1502 in dependence on the incoming events 730 is operable to filter the incoming events 730. It is necessary for the filter 1500 to additionally check that incoming events 730 satisfy sequence extending relations 412 before and during traversal of the DAG. This can be achieved in a number of ways. One way to check for satisfaction of the sequence extending relations 412 is to employ the sequence identifier component 416. Alternatively, one or more instruction sequences 1508 can be defined to include instructions for applying criteria associated with sequence extending relations 412. The latter case provides for a particularly efficient application of the sequence extending relations 412 as part of the execution of the executable code 1506 by the executor 1500.

The time-ordered incoming events 730 can be out-of-sequence in the sense that events belonging to different event sequences can be interleaved in the temporal ordering of the events. Accordingly the filter 1500 can be adapted to process multiple and potentially many pending partial event sequences as incoming events are received. In one embodiment, the executor 1502 is adapted to provide multiple threads of execution, each thread being suitable for the execution of instruction sequences 1508 and each thread corresponding to a received event sequence satisfying criteria for sequence extending relations 412. Thus, executing threads in a non-terminated (i.e. alive) state correspond to the identification of partial sequences of events in the incoming events 730. Threads can terminate on identification of a complete sequence of events according to the sequences represented by the DAG data structure 206. Further, threads can terminate on a determination that events fail to correspond to any sequence represented by the DAG data structure. Thus, in use, the filter 1500 of FIG. 15 is operable to identify event sequences in the incoming events 730 that partially and completely match sequences represented by the DAG data structure 206. Further, the filter 1500 is operable to identify events and series of events in the incoming events 730 that do not match sequences represented by the DAG data structure 206. In this way the filter 1500 provides the advantages of embodiments for filtering time-ordered incoming events previously described.

For example, the filtered time-ordered events can indicate an occurrence of interest by identifying partial, full or non-matched sequences based on the DAG. Examples of occurrences of interest include event sequences indicating security threats, intrusions, attacks or malicious use of resources, such as computing resources in an arrangement of computing components. Further, the failure to match an event sequence can itself constitute an occurrence of interest, such as events reflecting a deviation of behavior of a component or person from a set of acceptable behaviors represented by the DAG.

While the code generator 1504 and filter 1500 have been illustrated and described as separate components, it will be appreciated that the generator 1504 and filter 1500 could be combined. Further, the generator 1504 can be provided as a separate, external component that operates external to both the filter 1500 and the sequence identification apparatus 200, such as an external code generation facility. Further, while FIG. 15 illustrates a the filter 1500 coexisting with features of the sequence identification apparatus involved in the generation of the DAG data structure 206, it will be appreciated that the filter 1500 and associated code generator 1504 can alternatively be provided in a separate sequence identification apparatus, such as a dedicated filter apparatus.

Figures 16, 17:
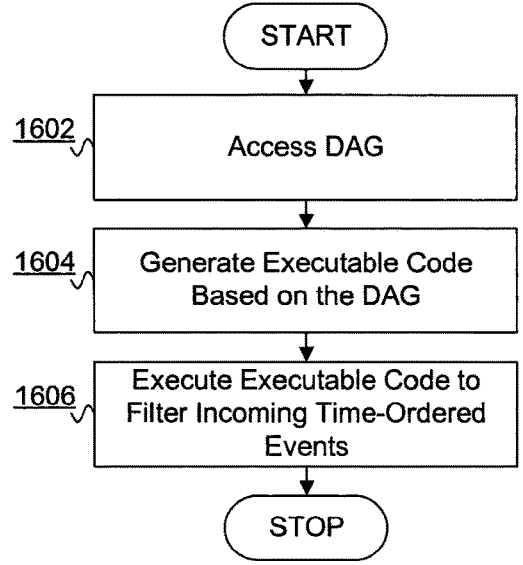

FIG. 16 is a flowchart of a method of the sequence identification apparatus of FIG. 15. Initially, at 1602, the code generator 1504 accesses the DAG data structure 206. At 1604 the code generator generates executable code 1506 including instruction sequences 1508 as described above. At 1606 the executor 1502 executes one or more of the instruction sequences 1508 in dependence on incoming events 730, such as attributes of incoming events 730, to filter the incoming events 730. The filtering of the method of FIG. 15 is suitable for identifying, for the incoming events 730, a partial match, complete match or failure to match event sequences represented by the DAG data structure 206.

In one embodiment, the execution status of the executor 1502 is recorded such that the stages of traversal of the DAG data structure 206 by way of the execution of instruction sequences 1508 can be reviewed. An ongoing record of the execution state of the instruction sequences 1508 can be used to determine which event sequences were matched with the DAG, and to what extent.

A detailed exemplary embodiment will now be described by way of example only. In the exemplary embodiment, event data is in a time-stamped tabular format (for example, as comma separated values with one or more specified fields storing date and time information) and arrives in a sequential manner, either row by row or in larger groups which can be processed row-by-row. Each column in the table has a domain $D_i$ and a corresponding attribute name $A_i$. There is a special domain O which plays the role of an identifier (e.g. row number or event id). Formally, data is represented by a function:

$$f: O \rightarrow D_1 \times D_2 \times \ldots \times D_n$$

which can be written as a relation $$R \subseteq O \times D_1 \times D_2 \times \ldots \times D_n$$

where any given identifier $o_i$ appears at most once. The notation $A_k(o_i)$ is used to denote the value of the $k^{th}$ attribute for object $o_i$.

The embodiment seeks to find ordered sequences of events (and subsequently, groups of similar sequences). To achieve this, sequence extending relations are defined.

In the exemplary embodiment, event sequences obey the following rules:
  each event is in at most one sequence
  events in a sequence are ordered by date and time
  an event and its successor are linked by relations between their attributes, such as equivalence, tolerance, and other relations.

These are referred to as sequence extending relations. Note that it is possible to have different sequence extending relations for different sequences. Further, it is possible to change the sequence extending relations dynamically. In the graph structure described below, the sequence extending relations are associated with nodes in the graph. In the exemplary embodiment, any event that is not part of an existing sequence is considered the start of a new sequence. For any attribute $A_i$ a tolerance relation $R_i$ can be defined where $$R_i : D_i \times D_i \rightarrow [0,1]$$

is a reflexive and symmetric fuzzy relation and $$\forall j : R_i(A_i(O_i), A_i(O_j)) = 1$$

Then the tolerance class of objects linked through attribute $A_i$ is $$T(A_i, o_m) = \{o_j / \chi_{nj} | R_i(A_i(o_m), A_i(o_j)) = \chi_{nj}\}$$

Note that this set includes (with membership 1) all objects with the attribute value $A_i(o_m)$. The tolerance class can be expressed equivalently as a set of pairs.

Finally the case of a total order relation $P_T$ is included, defined on a distinguished attribute (or small set of attributes) representing a timestamp. Sequences and projected sequences can then be defined $$\forall i : P_T(A_T(o_i), A_T(o_i)) = 1$$

$$\forall i \neq j : P_T(A_T(o_i), A_T(o_j)) > 0 \rightarrow P_T(A_T(o_j), A_T(o_i)) = 0$$

$$Q(o_i) = (o_i / \chi_{xi} | P_T(o_i, o_i) = \chi_{xi})$$

where $A_T$ is the timestamp attribute (or attributes) and the ordering of events models temporal ordering. The time attribute $t_i$ obeys $t_i \leq t_{i+1}$ for all i. It is treated as a single attribute although could be stored as more than one (such as date, time of day). In the exemplary embodiment a number of sequence extending relations $R_1 \ldots R_n$ are defined on appropriate domains. Two events oi and oj are potentially linked in the same sequence if $$\min\left(Q_T(o_i, o_j), \min_m(R_m(o_i, o_j))\right) \geq \mu$$

i.e. all required attributes satisfy the specified sequence extending relations to a degree greater than some threshold $\mu$. Thus $$\text{potential-link}(o_i, o_j, \mu) \leftrightarrow \min\left(Q_T(o_i, o_j), \min_m(R_m(o_i, o_j))\right) \geq \mu$$

and $$\text{linked}(o_i, o_j, \mu) \leftrightarrow \text{potential-link}(o_i, o_j, \mu)$$

AND $$\nexists o_k : (\text{potential-link}(o_i, o_k, \mu) \text{ AND potential-link}(o_k, o_j, \mu))$$

i.e. two events are linked if they satisfy the specified tolerance and equivalence relations to a degree greater than some threshold $\mu$ and there is no intermediate event.

In the exemplary embodiment equivalence classes are also defined on some of the domains, used to compare and categorize events from different sequences. An equivalence class on one or more domains is represented by a value from each domain—for example, the relation "hasTheSameParity" defined on natural numbers can contains pairs such as (0, 2), (0, 4), (2, 4), (1, 5), etc. Two equivalence classes (representing the sets of even and odd numbers) can be written [0] and [1] since all elements are linked to either 0 or 1 under the relation "hasTheSameParity". Similarly, for times denoted by day and hour values, equivalence can be defined for weekday rush hour (e.g. day="Mon-Fri", hour="8,9,17,18"), other-weekday (e.g. day="Mon-Fri", hour≠"8,9,17,18") and weekend (e.g. day="Sat,Sun"). These can easily be extended to fuzzy equivalence classes. The equivalence classes partition the objects such that each object belongs to exactly one equivalence class for each domain considered. In the fuzzy case, the sum of memberships in overlapping classes is 1 and at least one membership is assumed to be 0.5 or greater. In creating the graph only the largest membership is considered. In the case of two equal memberships (e.g. 0.5) deterministic procedure is used to choose one equivalence class. Formally, for a specified attribute Ai $$S(A_i, o_m) = \{o_j | A_i(o_j) = A_i(o_m)\}$$

and the set of associated equivalence classes (also called elementary concepts) is $$C_i = \{S(A_i, o_m) | o_m \in O\}$$

(for example, time and elapsed time, as described below.)

Figures 9, 10:
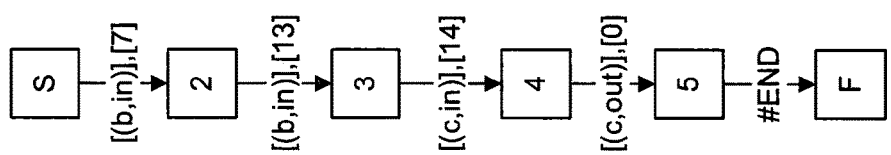
FIG. 9 is an AllowedActions table in accordance with an exemplary embodiment.
FIG. 10 is a directed acyclic graph representation of a first sequence in accordance with the exemplary embodiment.
Figure 11:
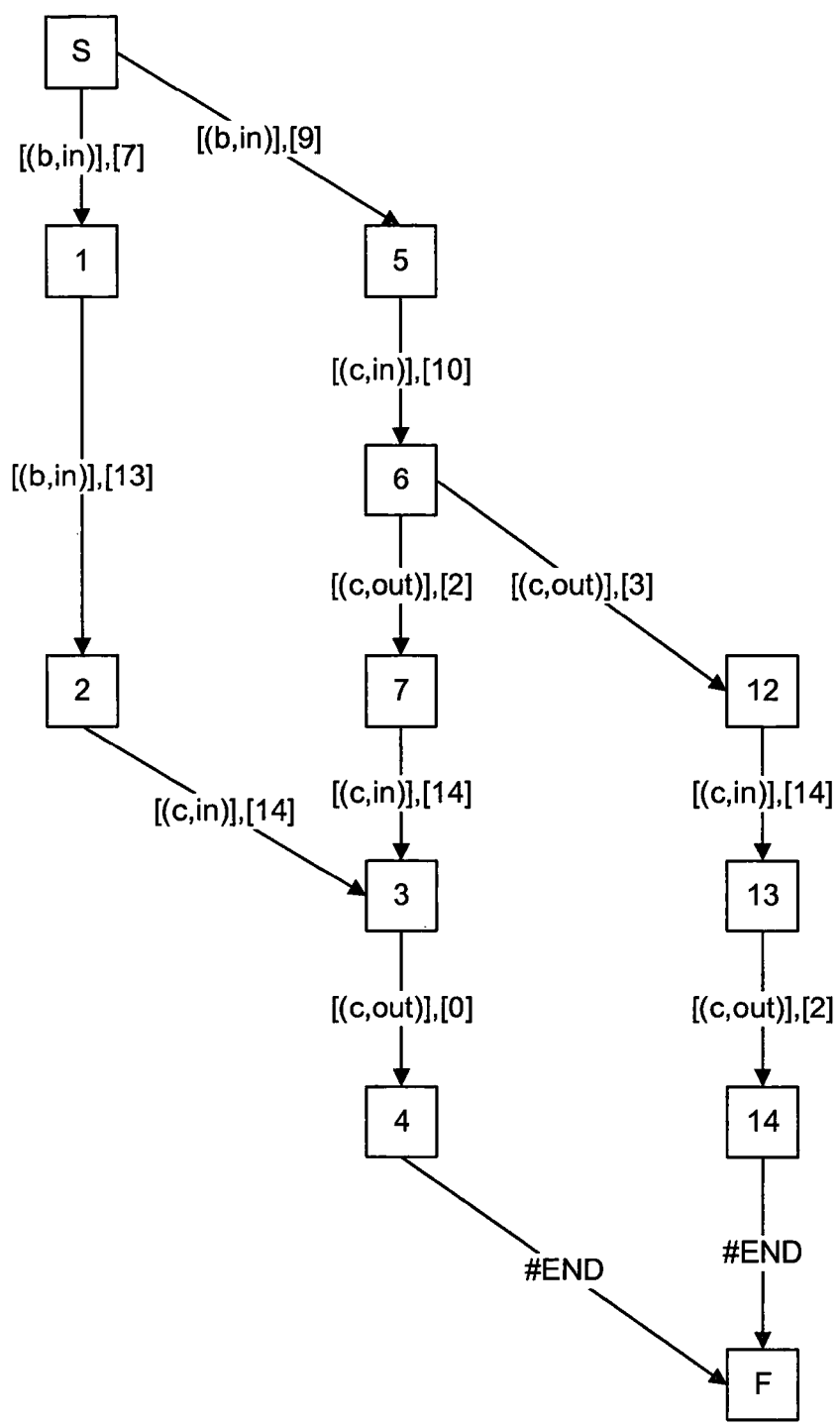
FIG. 11 is a directed acyclic graph representation of a first, second and third sequences in accordance with the exemplary embodiment.

In the propositional case $C_i$ contains just one set, whose elements are the objects for which attribute i is true. In the fuzzy case, elements are equivalent to some degree. Specifying a membership threshold gives a nested set of equivalence relations so that once a membership threshold is known the technique can proceed as in the crisp case. The operation can be extended to multiple attributes. The selected attributes are used to find the "EventCategorisation". This is an ordered set of equivalence classes arising from one or more attributes (or n-tuples of attributes)

$$B_k \in \{A_1, \ldots, A_n\}$$

$$\text{EventCategorisation}(o_i) = ([B_k(o_i)|k=1, \ldots m])$$

i.e. each $B_k$ is one or more of the attributes and the event categorization of some object $o_i$ is given by the equivalence classes corresponding to its attribute values. Note that the result is not dependent on the order in which the attributes are processed. This order can be optimized to give fastest performance when deciding which edge to follow from given node. For any set of sequences, a minimal representation of the sequences can be created using a DAG as illustrated in FIGS. 10 and 11. The graph is a deterministic finite automaton, with no loops. Each event is represented by a labeled edge. The edge label shows the equivalence classes applicable to the event, referred to as the event categorization below. The source node "S" is a single starting point for all sequences. To ensure a unique end node "F" a dummy "end of sequence" ("#END") event is appended to all sequences.

An example of the exemplary embodiment in use will now be described based on sample data used by the IEEE "Visual Analytics Science and Technology" (VAST) challenge in 2009. The sample data simulates access by employees to badge-locked rooms via numerous entrances. In summary, events in the data set include six attributes: "eventID" as a unique event identifier; "Date"; "Time"; "Emp" or "Employee" as a unique employee identifier as either "10", "11" or "12"; "Entrance" as a unique identifier of a security entrance as either "b", corresponding to access to a building, or "c" corresponding to access to a classified section of the building; and "Direction" as an access direction as either "in" or "out".

Table 1 provides the sample data set. Note that the data has been ordered by employee for ease of reading to identify event sequences, though in use the events would be time-ordered.

TABLE 1

| eventID | Date | Time | Employee | Entrance | Direction |
|---|---|---|---|---|---|
| 1 | jan-2 | 7:30 | 10 | b | in |
| 2 | jan-2 | 13:30 | 10 | b | in |
| 3 | jan-2 | 14:10 | 10 | c | in |
| 4 | jan-2 | 14:40 | 10 | c | out |
| 5 | jan-2 | 9:30 | 11 | b | in |
| 6 | jan-2 | 10:20 | 11 | c | in |
| 7 | jan-2 | 13:20 | 11 | c | out |
| 8 | jan-2 | 14:10 | 11 | c | in |
| 9 | jan-2 | 15:00 | 11 | c | out |
| 10 | jan-3 | 9:20 | 10 | b | in |
| 11 | jan-3 | 10:40 | 10 | c | in |
| 12 | jan-3 | 14:00 | 10 | c | out |
| 13 | jan-3 | 14:40 | 10 | c | in |
| 14 | jan-3 | 16:50 | 10 | c | out |
| 15 | jan-3 | 9:00 | 12 | b | in |
| 16 | jan-3 | 10:20 | 12 | c | in |
| 17 | jan-3 | 13:00 | 12 | c | out |
| 18 | jan-3 | 14:30 | 12 | c | in |
| 19 | jan-3 | 15:10 | 12 | c | out |

First a set of sequence extending relations is defined as a set of equality and permitted transition relations to detect candidate sequences. For a candidate sequence of n events:

$$S_1 = (o_{11}, o_{12}, o_{13}, \ldots, o_{1n})$$

the following computed quantities are defined

ElapsedTime $\Delta T_{ij} = \text{Time}(o_{ij}) - \text{Time}(o_{ij-1})$ with $\Delta T_{i1} = \text{Time}(o_{i1})$ and restrictions (for j>1)

$\text{Date}(o_{ij}) = \text{Date}(o_{ij-1})$ $0 < \text{Time}(o_{ij}) - \text{Time}(o_{ij-1}) \leq T_{thresh}$ $\text{Emp}(o_{ij}) = \text{Emp}(o_{ij-1})$ $(\text{Action}(o_{ij-1}), \text{Action}(o_{ij})) \in \text{AllowedActions}$ where $\text{Action}(o_{ij}) = (\text{Entrance}(o_{ij}), \text{Direction}(o_{ij}))$ where the relation "AllowedActions" is given by the table in FIG. 9. In the table of FIG. 9 the first action is indicated by a row and a following action is indicated by a column.

These constraints can be summarized as
events in a single sequence refer to the same employee; and
successive events in a single sequence conform to allowed transitions between locations and are on the same day, within a specified time of each other.

A suitable time threshold is chosen, such as $T_{thresh}=8$. This ensures anything more than 8 hours after the last event is a new sequence. Candidate sequences are identified by applying the sequence extending relations. Any sequence has either been seen before or is a new sequence. From the sample data, candidate sequences are made up of the events:

1-2-3-4
5-6-7-8-9
10-11-12-13-14
15-16-17-18-19

The equivalence class "EventCategorisation" is also defined for comparing events in different sequences:

EquivalentAction=$I_{Action}$
For Direction In, EquivalentEventTime={[7],[8], . . . }
For Direction Out, EquivalentElapsedTime={[0],[1],[2], . . . } where I is the identity relation and the notation [7] represents the set of all start times from 7:00-7:59, etc. With this definition events 5 and 10 are regarded as equivalent since they both have Entrance="b", Direction="In" and Time in "7:00-7:59". Formally, EventCategorisation ($o_5$)=([b,in],[7])
EventCategorisation ($o_{10}$)=([b,in],[7])

Similarly, events 7 and 12 are equivalent, as both have Entrance="c", Direction="Out" and ElapsedTime in "3:00-3:59". Each identified sequence is represented as a graph labeled by its event categorizations and combine multiple sequences into a minimal DAG representing the categorized version of all sequences seen so far, as illustrated in FIGS. 10 and 11.

Assuming that nodes are denoted by unique numbering, since the graph is deterministic each outgoing edge is unique. An edge can therefore be specified by its start node and its partial event categorization. It is also acceptable to refer to an edge by its partial event categorization label if there is no ambiguity about its start node. Standard definitions are used for "InDegree", "OutDegree", "IncomingEdges" and "OutgoingEdges" of a node, giving respectively the number of incoming edges, the number of outgoing edges, the set of incoming edges and the set of outgoing edges. Functions "Start" and "End" can also be applied to an edge in order to find or set start and end nodes respectively. Further, a function "EdgeCategorisation" can be used to find a categorization class for an edge. Further, the function "ExistsSimilarEdge(edge, endnode)" can be defined to return "true" when:

"edge" has end node "endnode", event categorization "L" and start node "S1";

a second, distinct, edge has the same end node and event categorization "L" but a different start node "S2"; and "S1" and "S2" have the same incoming edges: IncomingEdges(S1)=IncomingEdges(S2).

If such an edge exists, its start node is returned by the function "StartOfSimilarEdge(edge, endnode)". The function "CreateNewNode(Incoming, Outgoing)" creates a new node with the specified sets of incoming and outgoing edges.

The DAG can be used to identify sequences of events that have already been seen. If a new sequence is observed (i.e. a sequence which differs from each sequence in the graph by at least one event categorization) then it can be added to the graph using an algorithm such as is provided below. Note that the algorithm assumes a graph G=(V, E) such that new nodes are added to the set V and edges are added to/deleted from the set E. The algorithm proceeds in three distinct stages. In the first and second parts, the algorithm moves step-by-step through a new event sequence and a DAG, beginning at a start node "S". If an event categorization matches an outgoing edge, the algorithm follows that edge to a next node and moves on to the next event in the event sequence. If the new node has more than one incoming edge, the algorithm copies it; the copy takes the incoming edge that was just followed, and the original node retains all other incoming edges. Both copies have the same set of output edges. This part of the algorithm finds other sequences with one or more common starting events.

If at some point, a node is reached where there is no outgoing edge matching a next event's categorization. New edges and nodes for the remainder of the sequence are created, eventually connecting to the end node "F". Note that as the sequence is new, the algorithm must reach a point at which no outgoing edge matches the next event's categorization; if this happens at the start node "S" then the first stage is effectively missed.

Figure 14:
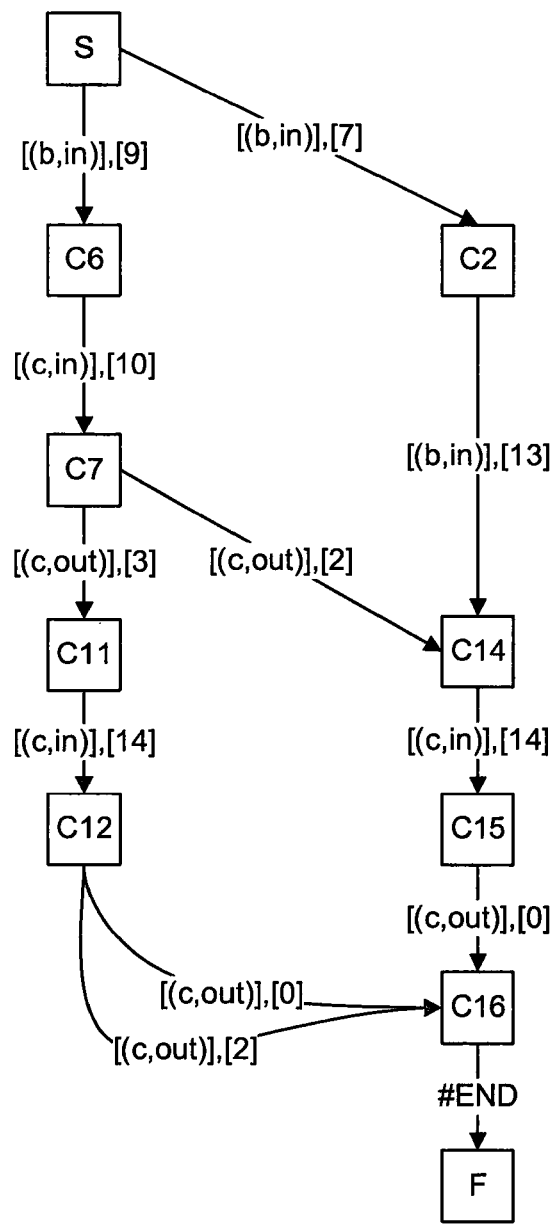
FIG. 14 is a directed acyclic graph representation of a first, second, third and fourth sequences generated in accordance with an exemplary algorithm in an embodiment.

Finally, in the third stage, the algorithm searches for sequences with one or more common ending events. Where possible, the paths are merged. FIGS. 12, 13 and 14 illustrate the development of the DAG after the first two sequences, then after addition of the third and finally after addition of the fourth sequence.

---

Algorithm ExtendGraph

Input :Graph G with start node S, end node F, representing the current DAG (minimal)
    CandidateSequence Q[0 - NQ] representing the candidate sequence; each element is an event identifier. The sequence is terminated by #END NB the sequence is not already present in the graph.
Output : updated minimal graph, incorporating the new sequence
Local variables : Node startNode, newNode, endNode, matchingNode
    Edge currentEdge, matchingEdge
    Categorisation currentCategorisation
    integer seqCounter;
startNode = S
seqCounter = 0
WHILE EventCategorisation(S[seqCounter]) ∈ OutgoingEdges(StartNode)
    currentEdge = (startNode, EventCategorisation(Q[seqCounter]) )
    endNode = End (currentEdge)
    IF InDegree (endNode) > 1
    THEN
        newNode = CreateNewNode({currentEdge}, OutgoingEdges(endNode))

---

Algorithm ExtendGraph (continued)

IncomingEdges(endNode) = IncomingEdges (endNode) − currentEdge
        startNode = newNode
    ELSE
        startNode = endNode
    seqCounter++
ENDWHILE
WHILE seqCounter < NQ         // create new path
    currentEdge = (startNode, EventCategorisation (S[seqCounter]) )
    startNode = CreateNewNode({currentEdge}, { })
    seqCounter++
ENDWHILE
currentCategorisation = #END
currentEdge = (startNode, #END )     // last edge, labelled by #END
IncomingEdges(F) = IncomingEdges (F) + currentEdge
endNode = F
WHILE nextEdgeSet contains exactly one element (i.e currentEdge)
        AND ExistsSimilarEdge(currentEdge, endnode)
    matchingNode = StartOfSimilarEdge(currentEdge, endnode)
    startNode = Start (currentEdge)
    IncomingEdges(endNode) = IncomingEdges (endNode) − {currentEdge}
    nextEdgeSet = IncomingEdges (startNode)
    IncomingEdges (matchingNode) = nextEdgeSet ∪ IncomingEdges (matchingNode)
    endNode = matchingNode
    currentEdge ∈ edgeSet //choose any element,"while" loop terminates if>1
END WHILE

---

Algorithm ReduceGraph

Input :Graph G, start node S, end node F, the current DAG (minimal)
    Sequence C[0 - NQ] representing the sequence of event categories to be removed. Each element is an event categorization. The sequence is terminated by #END NB the sequence must be present in the graph and there must be at least one sequence in the graph after removal.
Output : updated minimal graph, excluding the removed sequence
Local variables : Node startNode, endNode
    Edge currentEdge, matchingEdge
    Categorisation currentCategorisation
    integer seqCounter;
startNode = S
seqCounter = 0
currentEdge = (startNode, C[0])
endNode = End(currentEdge)
WHILE endNode ≠ F
    WHILE OutDegree(startNode) > 1
        AND InDegree(endNode) == 1
        AND OutDegree(endNode) == 1
        currentEdge = (endNode, C[seqCounter])
        seqCounter++
    END WHILE
    IF (InDegree(endNode) > 1)
        delete path from startNode to endNode
    startNode = endNode
    currentEdge = (startNode, C[seqCounter])
    endNode = End(currentEdge)
    seqCounter++
END WHILE

---

The DAG generated for the sample data set, sequence extending relations and equivalence classes in the exemplary embodiment described above can be used to generate a filter by conversion of the DAG to instructions for execution by an instruction executor such as a virtual machine, interpreter or other similar component. An exemplary embodiment of such a filter will now be described by way of example only.

The exemplary embodiment includes a virtual machine capable of reading an interleaved series of events and matching them to the sequences represented by a DAG. The virtual machine is operable with instructions generated to correspond to a DAG and executed to identify: sequences of events received in an incoming event stream that match or partially match complete sequences represented by the DAG; and events received in an incoming event stream that do not match sequences represented by the DAG.

In the exemplary embodiment, a DAG is compiled to a sequence of instructions for the virtual machine. The instructions contain an initialization section (labeled "LS"), an acceptance section (labeled "L0"), and code corresponding to nodes and edges in the DAG. A distinguished code label "E" denotes a final edge in the graph. Each sequence of events is represented by an execution thread. A partially recognized sequence corresponds to a suspended or executing thread; fully recognized sequences or rejected (unrecognized) sequences correspond to terminated threads.

A thread is represented by a small set of registers, a stack and a queue. A thread suspends execution on completion of processing event data, except where such processing results in the termination of the thread. Execution of a thread terminates successfully if a complete sequence is identified. Unsuccessful termination occurs on receipt of a set of events not recognized as an event sequence based on the DAG instructions. Lists of executing/suspended threads and terminated threads are maintained.

When not terminated, a thread is either executing or suspended and is recorded on an "open sequence list" (OSL). The return values from thread execution are:
SUSPENDED-SUCCESS
SUSPENDED-FAIL
TERMINATE-SUCCESS
TERMINATE-FAIL Each thread has an associated degree of match depending on how well event data matches fuzzy patterns used to describe the sequence. If this value falls below a predefined threshold during thread execution the computation can be unwound and restarted at a previously unconsidered path from a branching node.

The virtual machine of the exemplary embodiment is an exemplary instruction executor consisting of registers, storage areas for runtime structures (including stacks and queues) and code together with a set of instructions which make up the code and which operate on the registers and storage. These are described below.

Virtual Machine Registers
args[0 . . . n–1, n . . . m] (typed) argument registers corresponding to a row of event data. Registers from n upwards are used as working storage but are not saved on the stack.
N NextChoice: instruction label, provides an alternative execution address if a current instruction fails. Can be null.
C ContinuationInstruction: instruction label, indicates a next step for execution when new data arrives and is accepted by a current thread. Can be null.
M MatchDegree: number in the range 0-1 indicating membership of a sequence on its matched path through the DAG. This value is set by an "XOF" instruction (see below).

Virtual Machine Runtime Structures
Stack storage area for execution records (last in, first out stack).
RematchQueue Zero or more sets of n–1 argument registers stored as a queue (first in, first out).
USL unidentified sequence list
OSL open sequence list
ISL identified sequence list Each of the lists USL, OSL, ISL is initially empty and enables addition and removal of specified sequence threads from the list.

Other Virtual Machine Data
CP code pointer, indicates current instruction (not saved on stack)
StackTop top frame on stack.
UR UserReturn: returned result (match) from user code
TS thread status
nodeArgs[0 . . . n–1] saved arguments in top stack frame, accessed via StackTop
n number of arguments in data table.
types[0 . . . n–1] data types in data table
Threshold minimum value for MatchDegree Virtual Machine Instructions
Virtual machine instructions in accordance with an exemplary embodiment are listed below with abbreviated code, longer descriptive name (if appropriate), arguments, and a brief description.

RIF <userMethod(typed arguments)>: RejectIfFailure: Executes userMethod on the specified arguments. If the result of userMethod is less than or equal to a threshold, the thread suspends and returns the value "SUSPENDED-FAIL".

XOF <userMethod(typed arguments)>: ExtendOrFail: Executes userMethod with specified arguments (from arg registers and nodeArg registers). Return value is a number in the range [0,1] representing data match. If return value is less than or equal to a threshold, the virtual machine executes the "FAIL" instruction (see below). Otherwise MatchDegree is set to min(return value. MatchDegree) and execution continues with a next instruction.

XWA <L1> <L2>: ExecuteWithAlternative: Writes L2 into the NextChoice register and passes control to L1.

TNA: ThereIs No Alternative: Writes NULL into the NextChoice register

FAIL: Performs the following routine:

```
reset MatchDegree to value saved in top stack frame.
IF <NextChoice> is not null THEN
    continue execution from address given by <NextChoice>
ELSE IF <NextChoice> is null THEN
    DO   pop stack // (copies arguments into rematch queue)
    UNTIL NextChoice is non-null or stack is empty
    IF NextChoice is not null THEN
        continue execution from there
    ELSE If stack is empty THEN
        return TERMINATE -FAIL
    ENDIF
ENDIF
```

EXEC <label>: if label is null, execute "FAIL". Otherwise, continue execution from the instruction labeled by label.

PUSH: Allocate StackFrame and save registers N. C. M and <n–1> arguments.

POP: Performs the following routine:
Reset registers N, C, M and args to saved values
Set StackFrame to previous frame
QueueOnRematch (QOR) // copy saved args[0 . . . n–1] to rematch queue QOR: QueueOnRematch: Allocate space for argument registers 0 . . . n–1 at the back of the rematch queue and copy content of argument registers to the newly allocated space.

DFR: DequeueFromRematch: Copy content of argument registers from the front of the rematch queue and de-allocate the space used.

SLN: SaveLiveNode: Performs the following routine:

```
IF rematch queue is not empty THEN
    DFR    // dequeue a set of arguments from rematch queue
    EXEC Contin // continue execution at address in Contin
ELSE If rematch queue is empty,
    PUSH // save all registers in new stack frame
    IF Contin register is <E> THEN
        terminate execution
        return TERMINATE-SUCCESS
    ELSE
        suspend execution
        return SUSPEND-SUCCESS
    ENDIF
ENDIF
```

The execution of the virtual machine in the exemplary embodiment consists of the steps in the pseudo-code below.

```
read data for next event into argument registers a[0 ... n-1]
SET ThreadStatus to SUSPENDED-FAIL
WHILE (ThreadStatus == SUSPENDED-FAIL)
    IF (OSL contains untried threads) THEN
        select an untried thread and remove it from the OSL
        ThreadStatus = execute thread from L0
    ELSE              // i.e. no threads accepted data
        create new thread
        ThreadStatus = execute thread starting from LS
    ENDIF
    IF ThreadStatus == TERMINATE-SUCCESS THEN
        add thread to ISL
    ELSE IF ThreadStatus == TERMINATE -FAIL THEN
        add thread to USL
    ELSE IF ThreadStatus == SUSPENDED-SUCCESS THEN
        add thread to OSL
    ELSE IF ThreadStatus == SUSPENDED-FAIL THEN
        add thread to OSL
    ENDIF
ENDWHILE
```

In alternative embodiments, this algorithm can be extended to include testing for a time-out of a threshold maximum elapsed time since a most recently received event in a partially matched event sequence. Such testing can be used to terminate threads for which the elapsed time exceeds the threshold.

The exemplary embodiment will now be described with reference to the DAG of FIG. 11 representing for the sample data set of events of Table 1 based on the sequence extending relations and equivalence classes described above. Notably, the constraints of the sequence extending relations can be implemented as methods in a suitable programming language. In the exemplary virtual machine instructions, these methods can be called from a "Thread Acceptance Code" (L0) section. Sequence extending methods can also be provided by a user. In the exemplary embodiment the following methods are defined:

equalityCheck(v1, v2): where v1, v2 are of the same type taken from employee-id, date, entrance point, or access direction. Returns 0 if the check fails, 1 if it succeeds.

equivCheck(time, equiv-class): returns a number in [0, 1] representing a degree to which a time belongs to an equivalence class of times (can also be applied to time differences).

lessEqCheck(num1, num2): returns 1 if num1<=num2, or 0 otherwise.

allowedAction(ent1, dir1, ent2, dir2): checks that entrance point ent2, access direction dir2 is a valid action given a previous step entrance point ent1, access direction dir1. The allowedAction method implements the restriction illustrated in FIG. 9.

elaspsedTime(t1, t2): computes difference between times t1 and t2.

Partial exemplary virtual machine code pseudo-code is provided below for the DAG of FIG. 11, where "etc" indicates similar code for other nodes of the DAG that is not specified here for brevity.

```
// a[0]=eventid, 1=date, 2=time, 3=employeeid, 4=entrance, 5=direction
L0: // Thread Acceptance Code
    RIF equalityCheck(a[3], nodeArgs [3]) // accept if day & emp-id match
    RIF equalityCheck(a[1], nodeArgs[1])
    a[7] = elapsedTime(a[2], n[2])
    RIF lessEqCheck(a[7], 8) // Time threshold = 8
    RIF allowedAction(a[4], a[5], nodeArgs [4], nodeArgs[5])
    EXEC Contin // accepted - match to next edge
LS : // thread initialisation step
    NextChoice= null
    Contin = null
    Memb=1
    RIF equalityCheck(a[4],b)
    RIF equalityCheck(a[5],in)
    XWA <LS1> <LS2>
LS1 :
    XOF equivCheck (a[2], 7)
    Contin = L1
    SaveLiveNode
LS2 :
    TNA
    XOF equivCheck(a[2],9)
    Contin = L5
    SaveLiveNode
L1:
    TNA
    XOF equivCheck(a[2],13)
    XOF equalityCheck(a[4],b)
    XOF equalityCheck(a[5],in)
    Contin = L2
    SaveLiveNode
L2: ...etc...
L3:
    TNA
    XOF equivCheck(a[7],0)
    XOF equalityCheck(a[4],c)
    XOF equalityCheck(a[5],out)
    Contin = L4
    SaveLiveNode
L4: ...etc...
L5:
    TNA
    XOF equivCheck(a[2],10)
    XOF equalityCheck(a[4],c)
    XOF equalityCheck(a[5],in)
    Contin = L6
    SaveLiveNode
L6:
    XOF equalityCheck(a[4],c)
    XOF equalityCheck(a[5],out)
    a[7] = elapsedTime(a[2], n[2])
    XWA L6A, L6B
L6A:
    XOF equivCheck(a[7],2)
    Contin = L7
    SaveLiveNode
L6B:
    TNA
    XOF equivCheck(a[7],3)
    contin = L7
    SaveLiveNode
...etc...
```

In alternative embodiments, sets of virtual machine instructions are optimized to improve efficiency of execution of instructions, such as by re-ordering operations so that instructions most likely to fail are executed first. Other enhancements can be made to code generated to represent the DAG include: using an index table or switching code to select a most promising threads based on received event data; and using a time-out scheduler to cause threads to fail when a time elapsed since a previous event exceeds a threshold.

FIGS. 17 to 21 illustrate the above exemplary embodiment in use for filtering of the sample data events of table 1. In particular, FIG. 17 illustrates the status of the virtual machine after row 3 of the event data is read. FIG. 18 illustrates the status of the virtual machine after row 7 of the event data is read. FIG. 19 illustrates the status of the virtual machine after row 8 of the event data is read. FIG. 20 illustrates the status of the virtual machine after row 10 of the event data is read. FIG. 21 illustrates the status of the virtual machine after row 20 of the event data is read.

Insofar as embodiments described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of embodiments. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of embodiments.

It will be understood by those skilled in the art that, although embodiments have been described in relation to the above described example embodiments, every embodiment is not limited thereto and that there are many possible variations and modifications which fall within the scope of the claims.

The scope of the present invention includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A sequence identification apparatus comprising a processor, wherein the apparatus is adapted to access a directed acyclic graph data structure of equivalence classes of events in event sequences identified in a plurality of time-ordered events, and wherein the graph is optimized such that initial and final sub-sequences of event sequences having common equivalence classes are combined in the graph, the apparatus comprising:
a code generator adapted to generate executable code corresponding to the graph such that the code includes an instruction sequence for each event classification of the graph, the instruction sequence for an event classification being adapted to evaluate criteria to determine if an event corresponds to the event classification;
an executor adapted to execute the generated executable code such that, in use, the executable code filters incoming time-ordered events based on the graph; and
a sequence identifier adapted to identify the event sequence and further event sequences based on at least one sequence extending relation defining at least one relation between events, and wherein, in use, the executable code filters incoming time-ordered events satisfying the at least one sequence extending relation,
wherein the filtered incoming time-ordered events indicate an occurrence of interest by the identification of one of: a partial sequence of events in the incoming time-ordered events based on the graph, and a full sequence of events in the incoming time-ordered events based on the graph,
and wherein the incoming time-ordered events are events arising from an arrangement of computing components, and the occurrence of interest is a security occurrence, the apparatus further including a notifier for generating a notification of the security occurrence.

2. The sequence identification apparatus of claim 1 wherein the sequence identifier is implemented as executable code for execution by the executor.

3. The sequence identification apparatus of claim 1 wherein the executor provides multiple threads of execution, each thread being used for the execution of instruction sequences corresponding to a different path through the DAG.

4. The sequence identification apparatus of claim 3 wherein each of the threads can have one of a: suspended state; an executing state; and a terminated state, wherein the suspended and executing states indicate identification of a partial sequence of events in the incoming time-ordered events based on the graph, and wherein the terminated state indicates one of: an identification of a full sequence of events in the incoming time-ordered events based on the graph; and an unrecognised sequence of events in the incoming time-ordered events based on the graph.

5. A computer implemented method of sequence identification comprising:
accessing a directed acyclic graph data structure of equivalence classes of events in event sequences identified in a plurality of time-ordered events, and wherein the graph is optimised such that initial and final sub-sequences of event sequences having common equivalence classes are combined in the graph;
generating executable code corresponding to the graph such that the code includes an instruction sequence for each event classification of the graph, the instruction sequence for an event classification being adapted to evaluate criteria to determine if an event corresponds to the event classification;
executing the generated executable code to filter incoming time-ordered events based on the graph; and
identifying the event sequence and further event sequences based on at least one sequence extending relation defining at least one relation between events, and wherein, in use, the executable code filters incoming time-ordered events satisfying the at least one sequence extending relation,
wherein the filtered incoming time-ordered events indicate an occurrence of interest by the identification of one of: a partial sequence of events in the incoming time-ordered events based on the graph, and a full sequence of events in the incoming time-ordered events based on the graph, and wherein the incoming time-ordered events are events arising from an arrangement of computing components, and the occurrence of interest is a security occurrence, the method further including generating a notification of the security occurrence.

6. The computer implemented method of claim 5 wherein the sequence identifier is implemented as executable code for execution in the executing.

7. The computer implemented method of claim 5 wherein the executing provides multiple threads of execution, each thread being used for the execution of instruction sequences corresponding to a different path through the DAG.

8. The computer implemented method of claim 7 wherein each of the threads can have one of a: suspended state; an executing state; and a terminated state, wherein the suspended and executing states indicate identification of a partial sequence of events in the incoming time-ordered events based on the graph, and wherein the terminated state indicates one of: an identification of a full sequence of events in the incoming time-ordered events based on the graph; and an unrecognised sequence of events in the incoming time-ordered events based on the graph.

9. A non-transitory computer-readable storage medium storing a computer program element comprising computer program code to, when loaded into a computer system and executed thereon, cause the computer to perform the computer implemented method as claimed in claim 5.

* * * * *